United States Patent
Takagi

(10) Patent No.: US 9,254,570 B2
(45) Date of Patent: Feb. 9, 2016

(54) ROBOT DEVICE, ROBOT CONTROL METHOD, PROGRAM, RECORDING MEDIUM, AND CONTROL DEVICE

(71) Applicant: CANON KABUSHIKI KAISHA, Tokyo (JP)

(72) Inventor: Kiyoshi Takagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 14/244,792

(22) Filed: Apr. 3, 2014

(65) Prior Publication Data

US 2014/0303777 A1  Oct. 9, 2014

(30) Foreign Application Priority Data

Apr. 8, 2013  (JP) ................................. 2013-080057

(51) Int. Cl.
*B25J 9/16* (2006.01)

(52) U.S. Cl.
CPC ..................................... *B25J 9/1633* (2013.01)

(58) Field of Classification Search
CPC ...... B25J 9/1633; B25J 9/1638; B25J 9/1641; B25J 9/1651; B25J 9/1075; B25J 9/0045; B25J 9/0048; B25J 9/0051; Y10S 901/09; Y10S 901/01; G05B 2219/39201
See application file for complete search history.

(56) References Cited

FOREIGN PATENT DOCUMENTS

JP    2012-086354 A    5/2012

OTHER PUBLICATIONS

Petit, et al., "Bidirectional Antagonistic Variable Stiffness Actuation: Analysis, Design & Implementation", 2010 IEEE International Conference on Robotics and Automation, Anchorage Convention District, May 3-8, 2010, Anchorage, Alaska, USA, pp. 4189-4196.
(Continued)

*Primary Examiner* — Khoi Tran
*Assistant Examiner* — Adam Mott
(74) *Attorney, Agent, or Firm* — Canon U.S.A., Inc. IP Division

(57) ABSTRACT

A joint torque computing unit computes joint torque $T_1$ necessary to set a joint angle $\theta$ of a joint to a target joint angle $r_a$. A summing unit obtains a sum value $U_1$ representing a sum of generated force command values $u_{e1}$ and $u_{f1}$ as to mono-articular driving actuators, based on target stiffness $r_s$ of the joint. An elastic torque computing unit obtains elastic torque $T_{PC1}$ according to elasticity of the mono-articular driving actuators acting on the joint. A restricting unit restricts the total value of the joint torque $T_1$ and the elastic torque $T_{PC1}$, so as to satisfy restriction conditions of $|T_1+T_{PC1}| < U_1 \times r$, where r represents the moment arm radius of the link. A generated force computing unit computes the generated force command values $u_{e1}$ and $u_{f1}$ of the mono-articular driving actuators, based on the total value $(T_1+T_{PC1})$ restricted by the restricting unit.

15 Claims, 17 Drawing Sheets

(56) References Cited

OTHER PUBLICATIONS

Oshima, et al., "Mechanical Properties of Robot Arm Operated with Muscle Coordinate System Consisted of Bi-articular Muscles and Mono-articular Muscles—Muscle Contractile Forces and Viscoelastic Properties of Robot Arm-", (2000) Journal of the Japan Society for Precision Engineering, pp. 141-146, vol. 66, No. 1.

Oshima et al., "Mechanical Properties of Robot Arm Operated with Muscle Coordinate System Consisted of Bi-articular Muscles and Mono-articular Muscles", Journal of the Japan Society for Precision Engineering, vol. 66, No. 1 pp. 141-146.

ROBOT DEVICE, ROBOT CONTROL METHOD, PROGRAM, RECORDING MEDIUM, AND CONTROL DEVICE

BACKGROUND OF THE INVENTION

1. Field of the Invention

The present invention relates to a robot device having a control unit to control a pair of actuators for rotational driving of a link, a robot control method, a program, a recording medium, and a control device.

2. Description of the Related Art

The ability for end effectors to flexibly come into contact with objects is becoming important in control methods of manipulators. Application of this to industrial robots could realize cooperative work between humans and robots, facilitating work of fitting parts to each other by controlling the direction of flexibility of end effectors, and so forth.

Also, applying this to legged locomotive robots could alleviate shock to the torso by coming into contact with the ground softly, and enable smooth ambulation over unsmooth terrain by absorbing difference in height.

In order to realize control of flexibility of the end effectors, impedance control where force sensors are worn on the end effectors, control using artificial muscle actuators, and so forth, is being performed. It is known that while human muscles are actuators, they are also control mechanisms with variable viscoelasticity. Rubber pneumatic artificial muscle actuators, of which the McKibben type artificial muscle actuator is representative, are similar to human muscles with regard to their viscoelastic properties. Now, controlling the softness of the artificial muscle actuators included in a manipulator enables contact with an object with optional end effector flexibility.

"Mechanical Properties of Robot Arm Operated with Muscle Coordinate System Consisted of Bi-articular Muscles and Mono-articular Muscles", Toru OSHIMA, Tomohiko FUJIKAWA, and Minayori KUMAMOTO, Journal of The Japan Society for Precision Engineering, Vol. 66, No. 1 pp. 141-146 (hereinafter "Oshima et al") proposes a "three-pair six-muscle model" manipulator having, in addition to artificial muscle actuators which drive a first link and a second link, a bi-articular simultaneous driving actuator to drive the first link and second link at the same time. Oshima et al have verified that by making the elasticity of the artificial muscle actuators to be equal, in a case where external force is applied to the end effectors along a line connecting a first joint and an end effector, there is exhibited a feature in stiffness characteristics in that the eternal force direction of the end effector and the direction of motion agree. McKibben actuators are difficult to use in motion control, due to the following reasons. The viscoelastic properties of McKibben actuators are nonlinear, and also control has to be applied to an antagonistic arrangement.

On the other hand, Japanese Patent Laid-Open No. 2012-86354 discloses deriving a simple feedback control system using saturation of control input, which controls joint angle at the same time as with stiffness control of the end effectors.

The dynamics of manipulator systems changes depending on the mass of the end effectors. A control system which does not take this change into consideration will exhibit degradation in capabilities to control the joint angle, due to grasping a payload at the end effectors, and so forth. Control based on passivity is known as a control technique to maintain control capabilities and stability in a case where change in dynamics has occurred in a manipulator system.

However, the manipulator control disclosed in Japanese Patent Laid-Open No. 2012-86354 includes an integrator in the feedback system, to compensate for joint torque according to elastic elements of the actuator. Accordingly, control based on passivity such as Proportional Derivative (PD) control is not readily applied, and there is a problem in that change in mass at the end effectors due to grasping a payload or the like causes degradation in capabilities of tracking control of joint angle.

SUMMARY OF THE INVENTION

It has been found desirable to provide a robot device, a robot control method, a program, a recording medium, and a control device, capable of maintaining capabilities of tracking control of joint angle with regard to change in load of a link.

A robot device according to an aspect of the present invention includes: a first link rotatably linked to a base by a first joint; a pair of mono-articular driving actuators disposed on both sides of the first link, to generate tensile forces, and rotationally drive the first link on the first joint; and a control unit configured to obtain each generated force command value as to the mono-articular driving actuators, and control the mono-articular driving actuators. The control unit executes joint torque computation processing to obtain joint torque necessary to set the joint angle of the first joint to a target joint angle, summing processing to obtain a sum value indicating a sum of generated force command values as to the mono-articular driving actuators, based on a target stiffness of the first joint, elastic torque computation processing to obtain elastic torque according to elasticity of the mono-articular driving actuators acting on the first joint, restricting processing to restrict the total value of the joint torque and the elastic torque, so as to satisfy restriction conditions of $|T_1 + T_{PC1}| < U_1 \times r$, where $T_1$ represents the joint torque, $U_1$ represents the sum value, $T_{PC1}$ represents the elastic torque, and r represents the moment arm radius of the first link, and generated force computation processing to obtain the generated force command values of the mono-articular driving actuators, based on the total value restricted in the restricting processing.

A control device according to an aspect of the present invention is a control device to control a pair of mono-articular driving actuators, disposed on both sides of a first link rotatably linked to a base by a first joint, to generate tensile forces, and rotationally drive the first link on the first joint. The control unit executes joint torque computation processing to obtain joint torque necessary to set the joint angle of the first joint to a target joint angle, summing processing to obtain a sum value indicating a sum of generated force command values as to the mono-articular driving actuators, based on a target stiffness of the first joint, elastic torque computation processing to obtain elastic torque according to elasticity of the mono-articular driving actuators acting on the first joint, restricting processing to restrict the total value of the joint torque and the elastic torque, so as to satisfy restriction conditions of $|T_1 + T_{PC1}| < U_1 \times r$, where $T_1$ represents the joint torque, $U_1$ represents the sum value, $T_{PC1}$ represents the elastic torque, and r represents the moment arm radius of the first link, and generated force computation processing to obtain the generated force command values of the mono-articular driving actuators, based on the total value restricted in the restricting processing.

Further features of the present invention will become apparent from the following description of exemplary embodiments with reference to the attached drawings.

DESCRIPTION OF THE EMBODIMENTS

Embodiments for carrying out the present invention will be described in detail with reference to the drawings.

First Embodiment

In a first embodiment, simultaneous control of joint angle and stiffness of a manipulator using an artificial muscle actuator will be described.

1. Modeling

Figure 1:
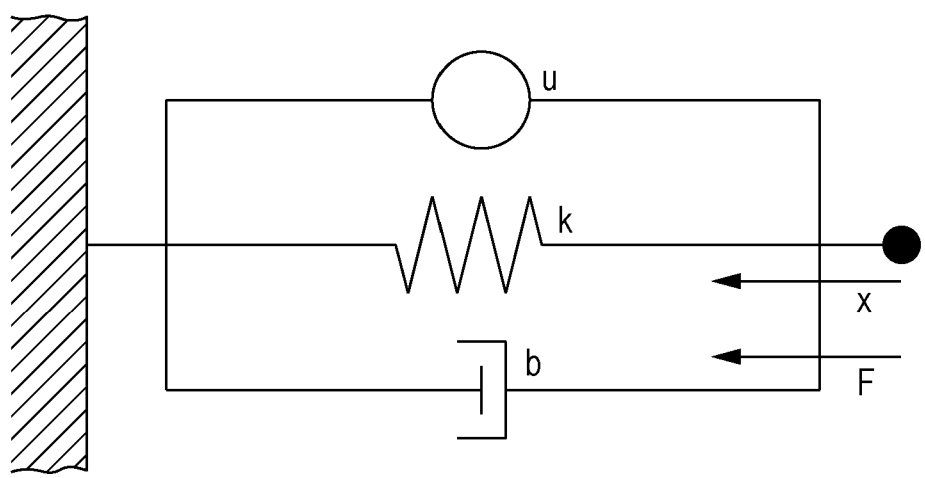
FIG. 1 is a schematic diagram illustrating a viscoelasticity model of an actuator.

In the first embodiment, control of a manipulator using an artificial muscle actuator is performed. An artificial muscle actuator is an actuator having properties similar to viscoelastic properties of muscle. A muscle is modeled using a force generating element, an elastic element, and a viscosity element, as illustrated in FIG. 1. In FIG. 1, u represents contractile force (tensile force) of the force generating element, and x represents the amount of contraction (amount of pull) of muscle where the direction of contraction (direction of pull) is the positive direction. The speed of contraction is expressed as follows.

$$\dot{x}$$

Also, the viscoelasticity of the muscle is modeled as $$F = u - kux - bu\dot{x} \quad (1)$$

where k represents the elastic constant, b represents the viscosity constant, and F represents the force generated at the muscle. This model is characterized in that the elasticity and viscosity of the force generated at the muscle have a non-linear element proportional to the generated force u of the force generating element.

Figure 2:
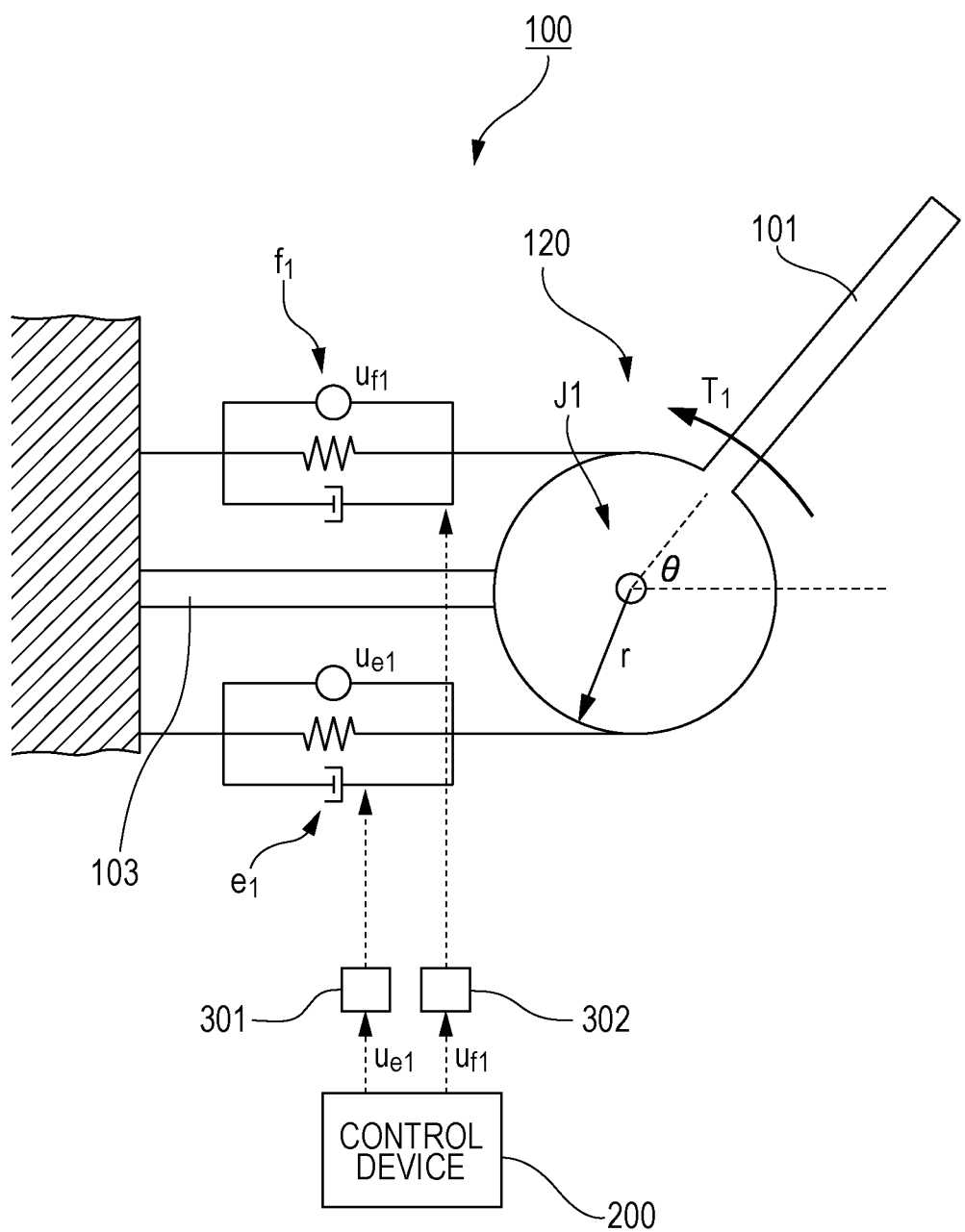
FIG. 2 is a schematic diagram illustrating a robot device according to a first embodiment.

FIG. 2 illustrates a robot device according to the first embodiment. The robot device 100 illustrated in FIG. 2 has a so-called one-link manipulator (hereinafter simply "manipulator") 120. The manipulator 120 has a link 101 which is a first link, and actuators $e_1$ and $f_1$ which are a pair of bi-articular driving actuators.

A base end of the link 101 is rotatably linked to a base 103 by a joint J1 which is a first joint.

The actuators $e_1$ and $f_1$ are pneumatic rubber artificial muscle actuators such as McKibben artificial muscle actuators, modeled after parallel connection of a force generating element, an elastic element, and a viscosity element.

The actuators $e_1$ and $f_1$ generate only tensile force (contractile force) as the generated force. In order to position the joint J1 at a certain joint angle, the actuators $e_1$ and $f_1$ have to be disposed in an antagonistic relation. Accordingly, the actuators $e_1$ and $f_1$ are disposed on either side of the link, so as to rotate the link 101 on the joint J1. One end of the actuators $e_1$ and $f_1$ is fixed to the base 103 and the other end to the link 101.

The generated force (contractile force) of the force generating elements of the actuators $e_1$ and $f_1$ disposed in an antagonistic relation, i.e., the generated force command values are expressed as $u_{e1}$ and $u_{f1}$, respectively. The rotational angle of the link 101 which is the joint angle (first joint angle) of joint J1 is expressed as θ. Further, inertia moment of the link 101 is expressed as I, and moment arm radius as r. These give the following motion expression.

$$I\ddot{\theta} = (u_{f1} - u_{e1})r - (u_{f1} + u_{e1})kr^2\theta - (u_{f1} + u_{e1})br^2\dot{\theta} \quad (2)$$

We can see that the difference in generated force (generated force command values) $u_{e1}$ and $u_{f1}$ at the first term to the right side of Expression (2) gives the joint rotational torque (joint torque), and the sum of generated forces $u_{e1}$ and $u_{f1}$ in the second and third terms to the right side change the stiffness and viscosity regarding the joint J1.

(2) Control System Design

The robot device 100 includes a control device 200, and two drivers 301 and 302 which respectively drive the actuators $e_1$ and $f_1$, based on the generated force command values $u_{e1}$ and $u_{f1}$ from the control device 200. That is to say, the drivers 301 and 302 feed air to the actuators $e_1$ and $f_1$, so as to generate force corresponding to the generated force command values at the actuators $e_1$ and $f_1$.

The control device 200 generates the generated force command values $u_{e1}$ and $u_{f1}$ corresponding to the respective actuators $e_1$ and $f_1$. The control device 200 then outputs the generated force command values $u_{e1}$ and $u_{f1}$ to the drivers 301 and 302, thereby controlling the generated force of the actuators $e_1$ and $f_1$.

Figure 3:
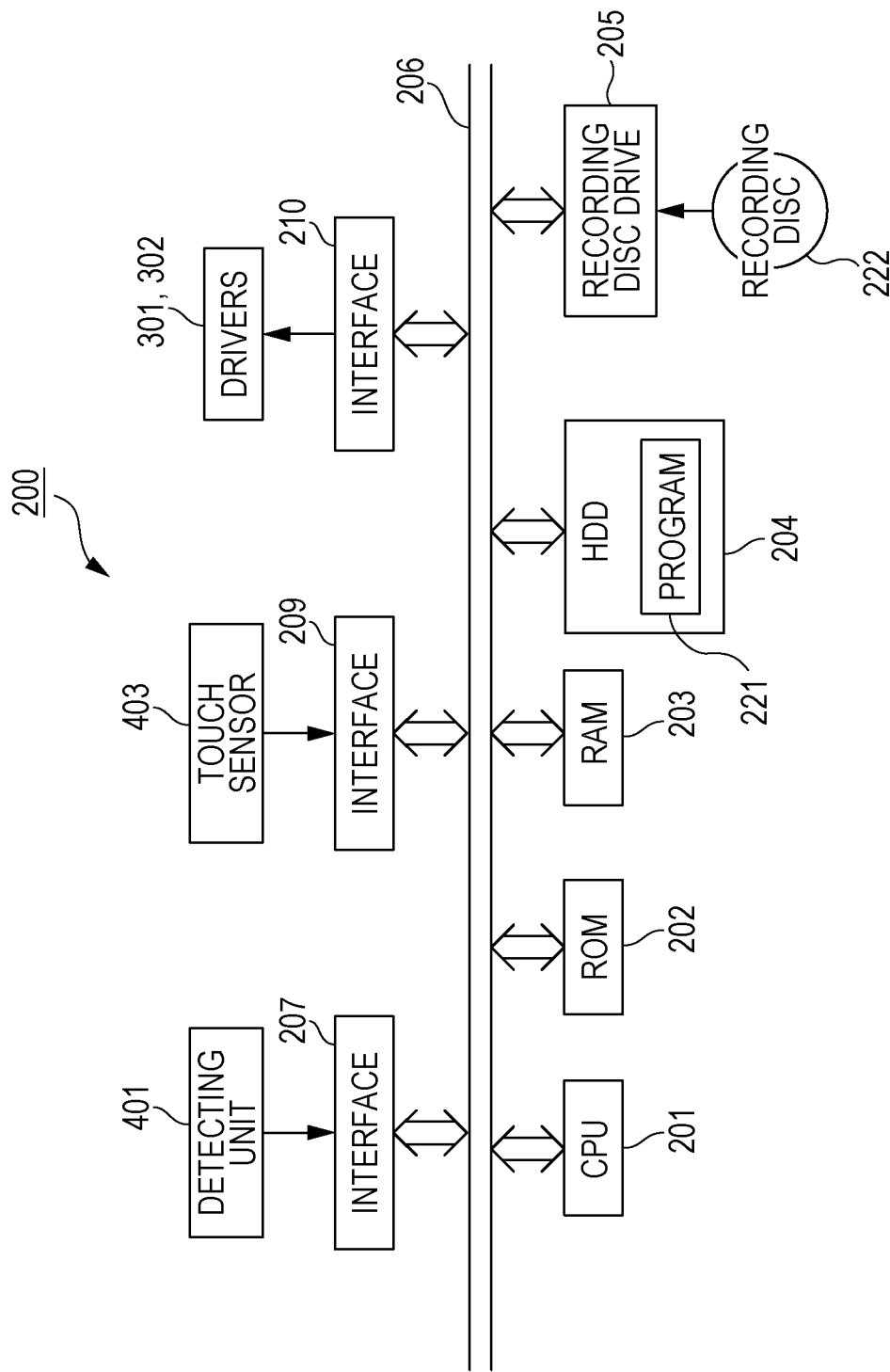
FIG. 3 is a block diagram illustrating a configuration of a control device according to the first embodiment.

Before describing the operations of the control device 200, the device configuration of the control device 200 will be described. FIG. 3 is a block diagram illustrating the configuration of the control device 200.

The control device 200 is configured as a computer, including a central processing unit (CPU) 201 serving as a control unit (computing unit). The control device 200 also includes read only memory (ROM) 202, random access memory (RAM) 203, a hard disk drive (HDD) 204, a recording disk drive 205, and various interfaces 207, 209, and 210.

The CPU 201 has connected thereto the ROM 202, RAM 203, HDD 204, recording disk drive 205, and various interfaces 207, 209, and 210, via a bus 206. The ROM 202 stores basic programs such as a basic input/output system (BIOS) and so forth. The RAM 203 is a storage device which temporarily stores the results of computation processing performed at the CPU 201.

The HDD 204 serves as a storage unit to store various types of data, such as results of computation processing performed at the CPU 201, and as a recording medium recording programs 221 whereby the CPU 201 executes various types of computation processing described later. The CPU 201 executes various types of computation processing based on the programs 221 recorded in the HDD 204.

The disk drive 205 reads out various types of data and programs recorded in a recording disc 222.

The aforementioned drivers 301 and 302 are connected to the interface 210. The CPU 201 outputs the generated force command values $u_{e1}$ and $u_{f1}$ to the drivers 301 and 302 via the bus 206 and interface 210. Thus, the drivers 301 and 302 generate generated force at the actuators $e_1$ and $f_1$, corresponding to the generated force command values $u_{e1}$ and $u_{f1}$.

In the first embodiment, the robot device 100 includes a detecting unit 401 which is a first detecting unit omitted from illustration in FIG. 1, and a touch sensor 403. The detecting unit 401 is disposed at the joint J1 in FIG. 1, and detects the joint angle $\theta$ of the joint J1. The touch sensor 403 is disposed on the link 101, and detects whether or not an object has come into contact with the link 101.

The detecting unit 401 is connected to the interface 207, so that a signal indicating the detected joint angle $\theta$ is transmitted to the CPU 201 via the interface 207 and bus 206. The touch sensor 403 is connected to the interface 209, so that a signal indicating whether or not there has been contact is transmitted to the CPU 201 via the interface 209 and bus 206.

Figure 4:
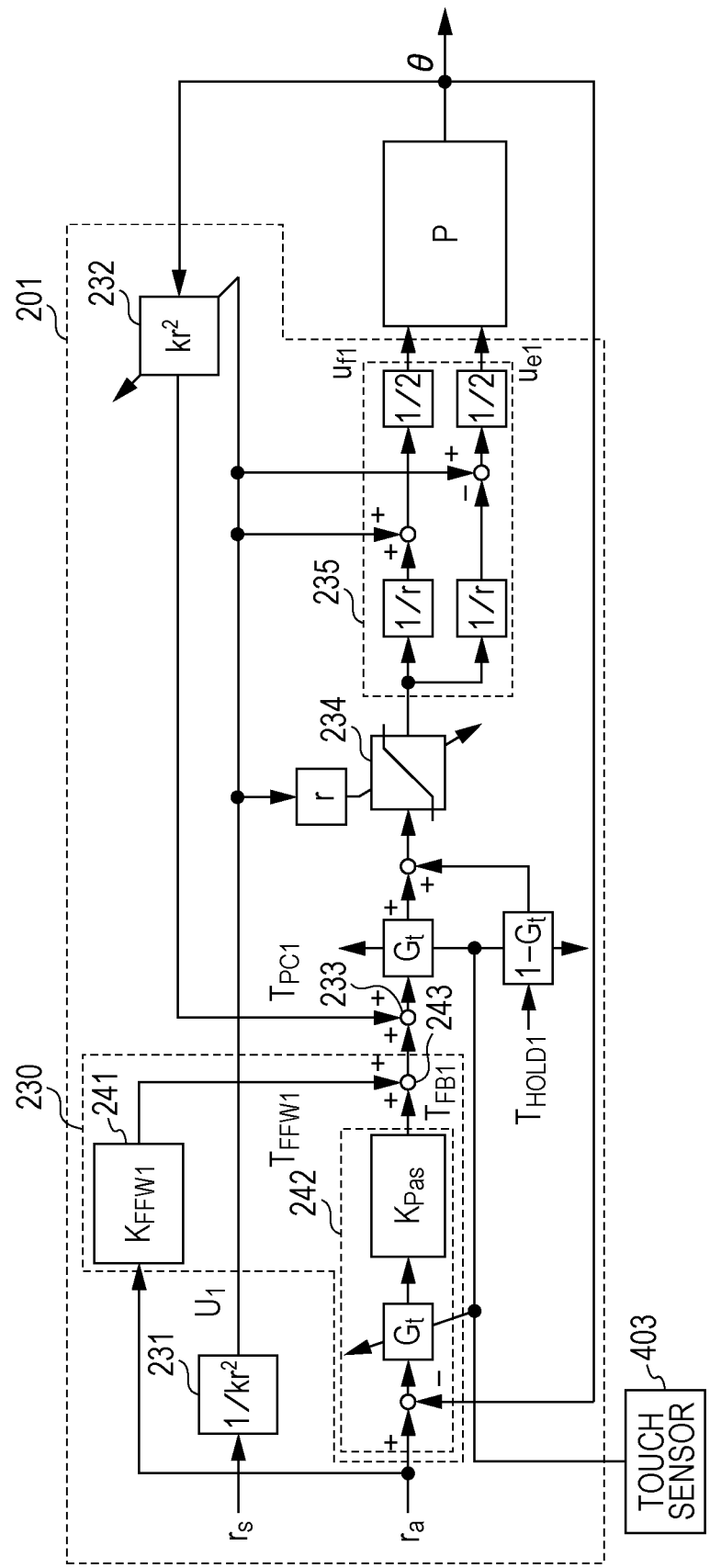
FIG. 4 is a functional block line diagram for describing control operations of a CPU according to the first embodiment.

FIG. 4 is a functional block line diagram for describing control operations of the CPU 201. A robot control method will be described with reference to FIG. 4. Note that in FIG. 4, the manipulator 120 is denoted by reference symbol P. The CPU (control unit) 201 of the control device 200 functions as each part illustrated in FIG. 4 by reading out the program 221 from the HDD 204 and executing the program 221.

The CPU 201 functions as a joint torque computing unit 230 which executes joint torque computation processing, a summing unit 231 which executes summing processing, and an elastic torque computing unit 232 which executes elastic torque computation processing, based on the program 221. The CPU 201 further functions as an adding unit 233, a restricting unit 234 which executes restriction processing, and a generated force computing unit 235 which executes generated force computing processing, based on the program 221.

In the first embodiment, the joint J1 is positioned at a target joint angle $r_a$, and at the same time, the stiffness of the joint J1 is controlled. In a case of performing robust control based on passivity, designing the control taking the integrator into consideration is difficult.

Accordingly, in the first embodiment, an elasticity compensation loop is included, and elastic force is cancelled in a case where there is no contact at the end effectors and there is no need for stiffness control. The control system is designed based on passivity, thereby improving robustness regarding positioning control.

2.1 Viscoelastic Force Compensation

Let us represent the target joint angle of the joint J1 by $r_a$, and the target stiffness of the joint J1 by $r_s$. The joint torque computing unit 230 computes a joint torque $T_1$ necessary for setting the joint angle $\theta$ of the joint J1 to the target joint angle $r_a$, as joint torque computation processing (joint torque computation step).

Specifically, the joint torque computing unit 230 includes a feed-forward computing unit 241 which executes feed-forward computation processing, a feedback computing unit 242 which executes feedback computation processing, and an adding unit 243 which executes adding processing.

The feed-forward computing unit 241 performs feed-forward computation based on the target joint angle $r_a$, to obtain feed-forward control torque $T_{FFW1}$ as to the joint J1. The feedback computing unit 242 performs feedback computation based on the difference between the joint angle $\theta$ and the target joint angle $r_a$ ($\theta - r_a$), to obtain feedback control torque $T_{FB1}$. More specifically, the feedback computing unit 242 performs PD control to compensate the difference ($\theta - r_a$), as feedback computation processing. The adding unit 243 then adds the feed-forward control torque $T_{FFW1}$ to the feedback control torque $T_{FB1}$ so as to obtain the joint torque $T_1$. That is to say, the joint torque is defined as $T_1$=feedback control torque $T_{FB1}$+feed-forward control torque $T_{FFW1}$. A transfer function used by the feedback computing unit 242, which is a feedback control system, will be represented by $K_{Pas}$.

If we write the control input to compensate for elastic force of the actuators $e_1$ and $f_1$ (elastic torque) as $T_{PC1}$, this yields the following.

$$T_{PC1} = r_s \theta \quad (3)$$

That is to say, the elastic torque computing unit 232 computes the elastic torque $T_{PC1}$ due to the elasticity acting upon the joint J1, based on Expression (3), as elastic torque computation processing (elastic torque computation step).

Now, if we determine generated force command values $u_{e1}$ and $u_{f1}$ from Expression (2) so as to satisfy $$(u_{f1} - u_{e1})r = (T_1 + T_{PC1}) \quad (4)$$

joint torque $T_1$ and elastic torque $T_{PC1}$ can be obtained.

However, conditions $$(u_{f1} + u_{e1})kr^2 = r_s \quad (5)$$

regarding the stiffness of the joint J1 have to be satisfied at the same time.

If we define $U_1$ as a sum value $$u_{f1} + u_{e1} = U_1 \quad (6)$$

indicating the sum of the generated force command values $u_{e1}$ and $u_{f1}$, the generated force command values $u_{e1}$ and $u_{f1}$ need to be determined so as to satisfy $$U_1 = r_s / kr^2. \quad (7)$$

That is to say, the summing unit 231 obtains the sum value $U_1$ based on the target stiffness $r_s$ of the joint J1, i.e., based on the relational expression in Expression (7), as summing processing (summing step).

In order to satisfy both the total value of torque $(T_1 + T_{PC1})$ and sum value $U_1$ of contractile force at the same time, Expressions (4) and (6) can be solved regarding $u_{e1}$ and $u_{f1}$ so that the following is obtained.

$$u_{f1} = \frac{U_1 + (T_1 + T_{PC1})/r}{2},$$
$$u_{e1} = \frac{U_1 - (T_1 + T_{PC1})/r}{2} \quad (8)$$

However, artificial muscle actuators only generate force in the contracting direction (direction of pull), so the conditions of $$u_{f1} > 0, u_{e1} > 0 \quad (9)$$

have to be satisfied at the same time.

The conditions of $$(T_1 + T_{PC1})/r < U_1, (T_1 + T_{PC1})/r > -U_1 \quad (10)$$

are obtained from Expressions (8) and (9).

That is to say, if the total value of torque $(T_1 + T_{PC1})$ satisfies the conditions of $$-U_1 r < T_1 + T_{PC1} < U_1 r \quad (11)$$

the manipulator 120 can set the stiffness of the joint J1 to the target value $r_s$, and also at the same time realize positioning at the target angle $r_a$ by torque $T_1$.

Expression (11) can be realized by restricting control input as in the following.

$$|T_1 + T_{PC1}| < U_1 r \quad (12)$$

That is to say, the adding unit 233 generates a total value $(T_1 + T_{PC1})$ obtained by totaling the joint torque $T_1$ and elastic torque $T_{PC1}$. Next, the restricting unit 234 restricts the total value $(T_1 + T_{PC1})$ so as to satisfy the restriction conditions of $|T_1 + T_{PC1}| < U_1 \times r$ (restricting step). Next, the generated force computing unit 235 computes the generated force command values $u_{e1}$ and $u_{f1}$ of the actuators $e_1$ and $f_1$ based on the total value of torque $(T_1 + T_{PC1})$ restricted by the restricting unit 234, using Expression (8) (generated force computation step).

Now, FIG. 4 illustrates an arrangement where a touch gain Gt is introduced, and in a case where there touch occurs, Gt=0 is set so as to cut off the feedback system and muscle elasticity compensation loop. Thus, the stiffness of the link 101 can be speedily switched to the target stiffness $r_s$ at any point-in-time, such as when having detected that the link 101 has touched a person or an object.

In the first embodiment, the integrator is not necessary in the feedback computing unit 242 compensating for muscle elasticity, so a PD control system is used. The transfer function $K_{Pas}$ is as follows.

$$K_{Pas}(s) = \left(25 + \frac{0.14s}{1/(100 \cdot 2 \cdot \pi)s\, 1}\right) \quad (13)$$

Figure 5:
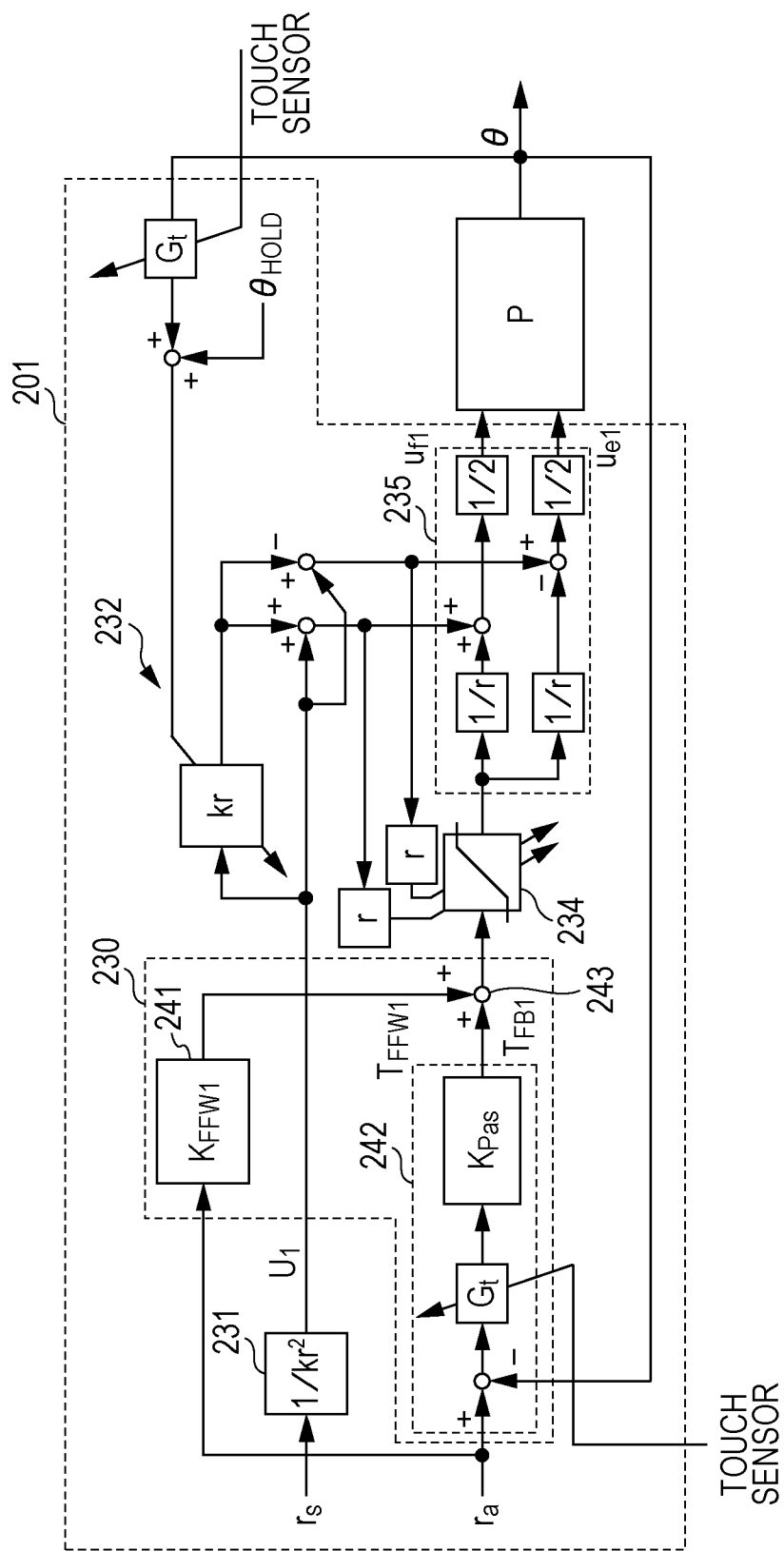
FIG. 5 is a functional block line diagram for describing control operations of a CPU according to the first embodiment.

Now, the control block illustrated in FIG. 4 may be equivalently replaced with the control block illustrated in FIG. 5. Rewriting Expression (3) using the sum value $U_1$ of generated force yields Expression (14).

$$T_{PC1} = r_s \theta = kr^2 U_1 \theta \quad (14)$$

Note that the CPU 201 serving as a control unit computes $U_1 \times k \times r^2 \times \theta$, thereby calculating the elastic torque $T_{PC1}$. Substituting this into Expression (8) yields Expression (15).

$$u_{f1} = \frac{U_1(1 + kr\theta) + T_1/r}{2}, \quad (15)$$
$$u_{e1} = \frac{U_1(1 - kr\theta) - T_1/r}{2}$$

The conditions whereby force of the actuators $e_1$ and $f_1$ is generated in the contractile direction alone are as follow.

$$-U_1 r(1 + kr\theta) < T_1 < U_1 r(1 - kr\theta) \quad (16)$$

The control input (joint torque) $T_1$ is restricted with regard to the upper and lower limit values with the joint angle $\theta$ as a parameter, as in Expression (16), and further distributed as in Expression (15). Thus, the manipulator 120 sets the stiffness of the joint J1 to the target value $r_s$ using a control system not including an integrator, like a PD control system or the like, and at the same time the target angle $r_a$ is positioned by the torque $T_1$.

While the first embodiment has illustrated a control system which compensates muscle elasticity, muscle viscosity may be compensated by adding joint angular velocity to the control loop.

2.2 Trajectory Design

Figure 6A:
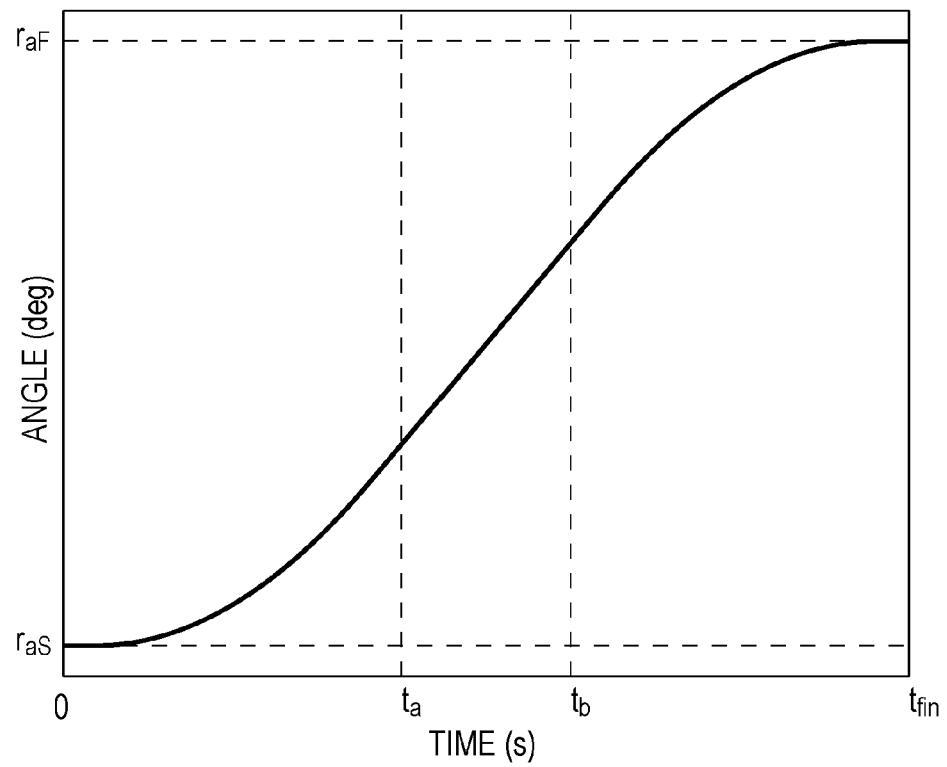
FIGS. 6A and 6B are diagrams illustrating trajectory design according to the first embodiment.
Figure 6B:
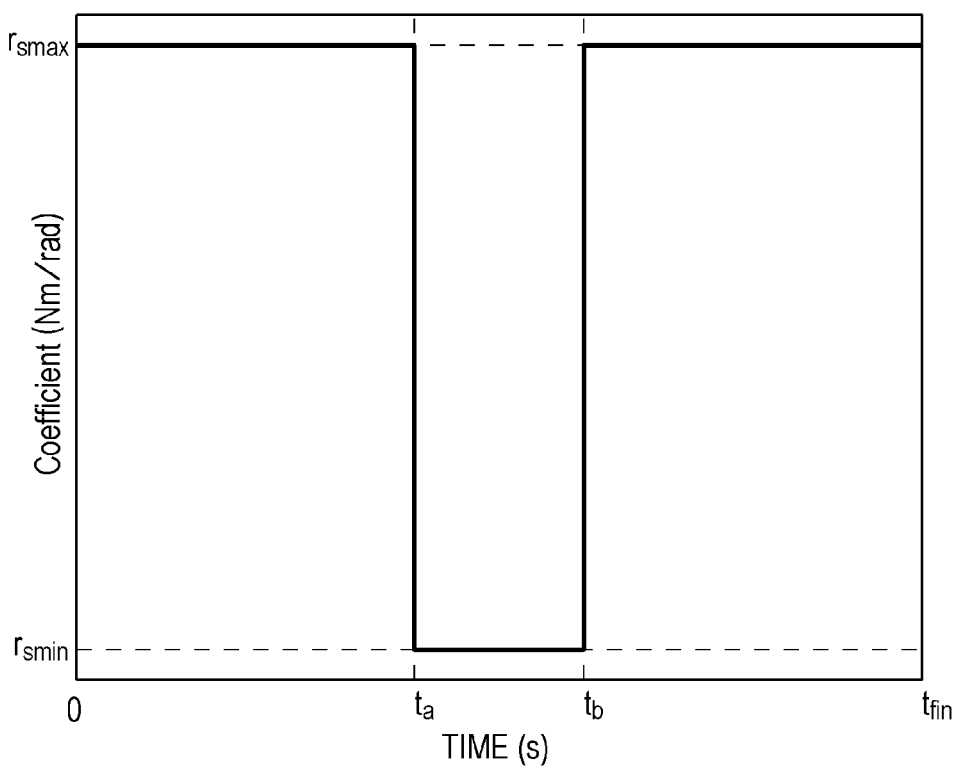

Next, a design method for the target trajectory $r_a$ and target stiffness $r_s$ of the joint J1 will be described. In the first embodiment, the target trajectory angle $r_a$ uses a trajectory having an acceleration zone, a constant velocity zone, and a deceleration zone, as illustrated in FIG. 6A. Here, $r_{aS}$ and $r_{aF}$ are the initial angle and target angle of the trajectory, respectively. Also, $t_a$, $t_b$, and $t_{fin}$ are the starting time of the constant velocity zone, ending time of the constant velocity zone, and ending time of positioning. Further, the target stiffness $r_s$ is set such that high stiffness $r_{smax}$ is achieved during the acceleration zone, and low stiffness $r_{smin}$ at the constant velocity zone, as illustrated in FIG. 6B. Due to changing the stiffness, at the time of starting driving the manipulator 120 is accelerated by elastic force of the muscle, and in the constant velocity zone is driven mostly by inertial due to the low stiffness. Accordingly, driving using little muscle force generation is enabled.

In the first embodiment, trajectory having an acceleration zone, a constant velocity zone, and a deceleration zone has been described, but a trajectory not having a constant velocity zone, such as a minimum jerk trajectory for example, may be used. Further, the target stiffness may be constant in a case where efficiency of driving is not taken into consideration.

(3) Simulation

Simulation was performed using the control system described above. The inertia moment of the link 101 was set to I=8.3×10⁻² kgm², the moment arm radius to r=0.1 m, and the elastic constant and viscosity constant to k=25 and b=3, respectively. The target trajectory $r_a$ was set such that initial angle $r_{aS}$=0 degree, target angle $r_{aF}$=20 degrees, constant velocity zone starting time $t_a$=0.35 seconds, constant velocity zone ending time $t_b$=0.45 seconds, and positioning ending time $t_{fin}$=0.8 seconds. The target stiffness for the joint J1 was $r_{smax}$=2.3×k×r² Nm/rad, $r_{smin}$=0.8×k×r² Nm/rad. Now, since k and r are constants, it is sufficient to control $U_1$ which is the sum of generated force so as to be $U_1$=2.3 in the acceleration and deceleration zones and $U_1$=0.8 in the constant velocity zone.

Figure 7B:
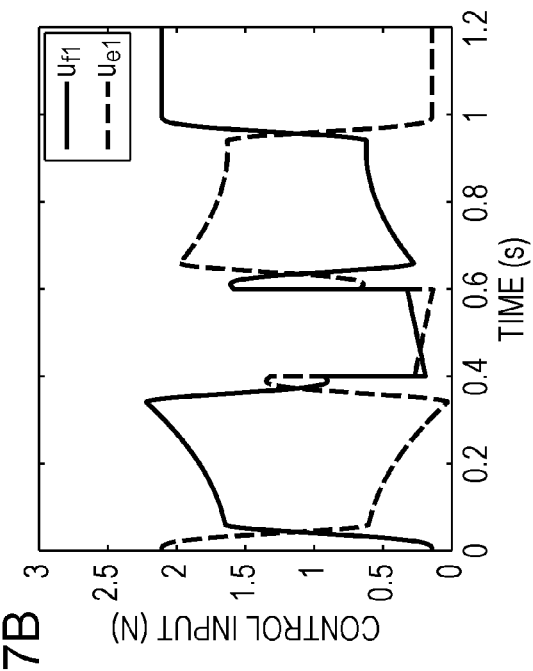
FIGS. 7A through 7D are diagrams illustrating simulation results according to the first embodiment.
Figure 7D:
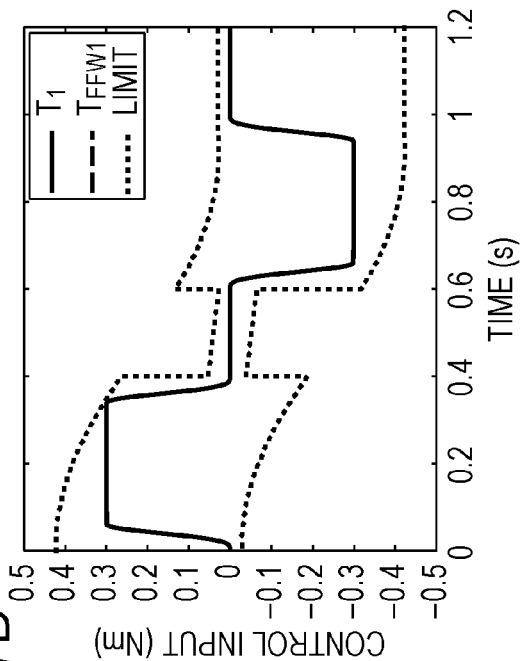
Figure 7A:
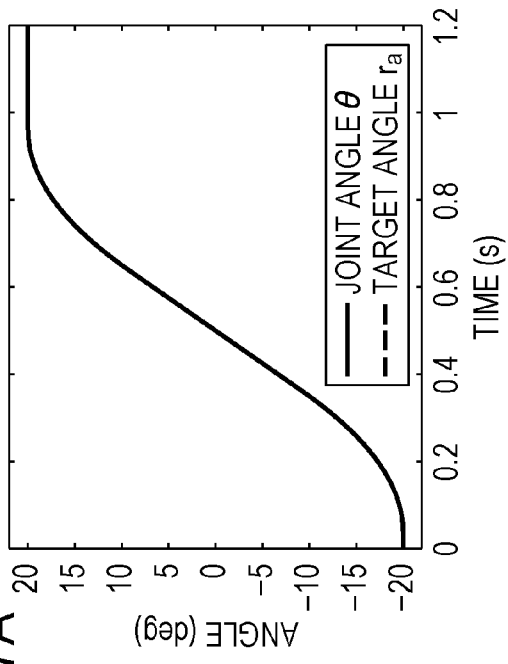
Figure 7C:
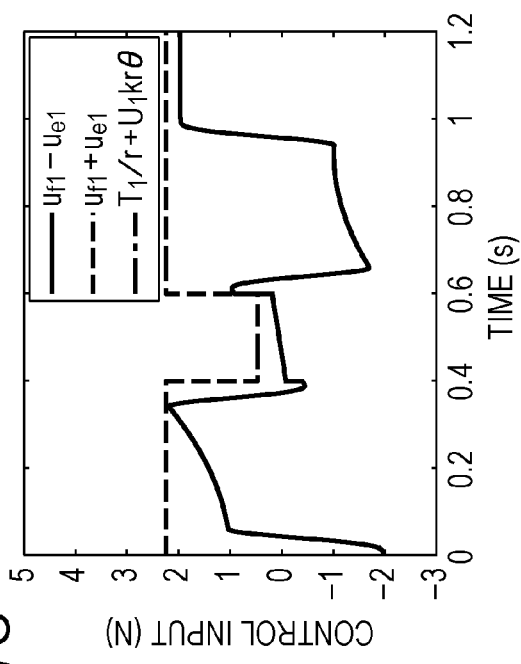

FIG. 7A illustrates the joint angle $\theta$ and target angle $r_a$ by a solid line and broken line, respectively, and FIG. 7B illustrates the response for the generated force command values $u_{e1}$ and $u_{f1}$ by a solid line and broken line, respectively. FIG. 7C illustrates the difference between the generated force command values $u_{e1}$ and $u_{f1}$ by a solid line, the sum by a broken line, and the response for $T_1/r + U_1 \times k \times r \times \theta$ by a single-dot broken line. Further, FIG. 7D illustrates the joint torque $T_1$ by a solid line, the feed-forward control torque $T_{FFW1}$ thereof by a broken line, and the upper and lower limit values of the control torque given in Expression (16) by dotted lines.

It can be seen from FIG. 7A that the joint angle $\theta$ and target angle $r_a$ match precisely, and that the joint J1 is positioned to the target angle. It can be seen from FIG. 7B that the generated force command values $u_{e1}$ and $u_{f1}$ distribute the joint torque $T_1$ of the feedback control system according to the conditions given in Expressions (15) and (16), and that the contractile force (tensile force) of artificial muscle actuators only assumes positive values. In FIG. 7C, $u_{f1}$-$u_{e1}$ indicated by a solid line is overlapped with the $T_1/r+U_1 \times k \times r \times \theta$ indicated by a single-dot broken line, thereby satisfying the conditions of Expression (4). Also, $u_{f1}+u_{e1}=U_1$ indicated by the broken line is 2.3 in the acceleration zone up to 0.35 seconds and the deceleration zone after 0.45 seconds, and 0.8 in the constant velocity zone, so it can be seen that the stiffness of the joint J1 is being controlled to the target values. It can be seen from FIG. 7D that the joint torque $T_1$ and feed-forward control torque $T_{FFW1}$ agree as nominal values for inertia moment.

Figure 8A:
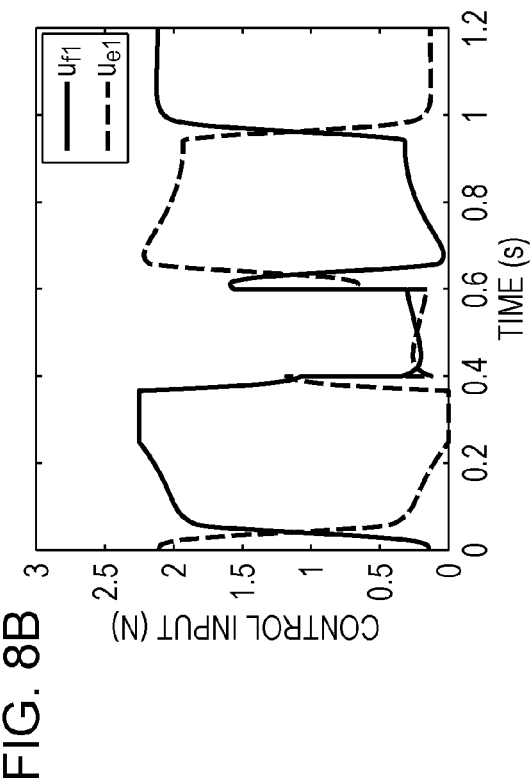
FIGS. 8A through 8D are diagrams illustrating simulation results according to the first embodiment.
Figure 8B:
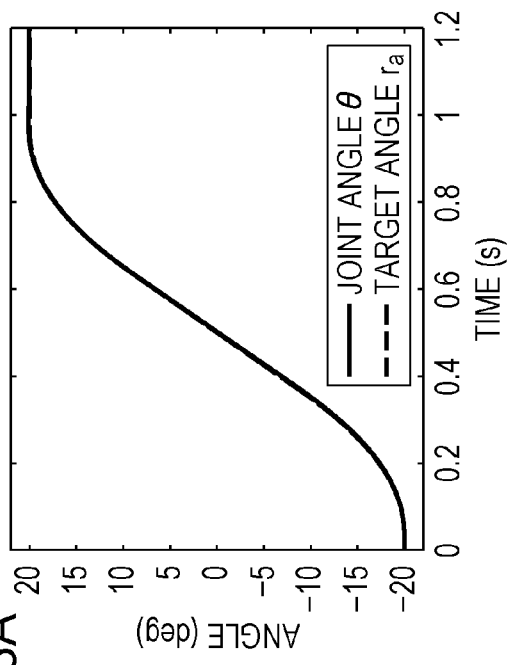
Figure 8C:
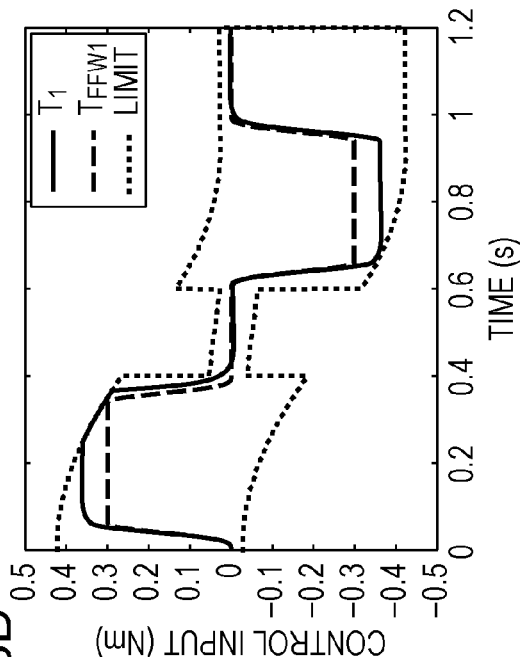
Figure 8D:
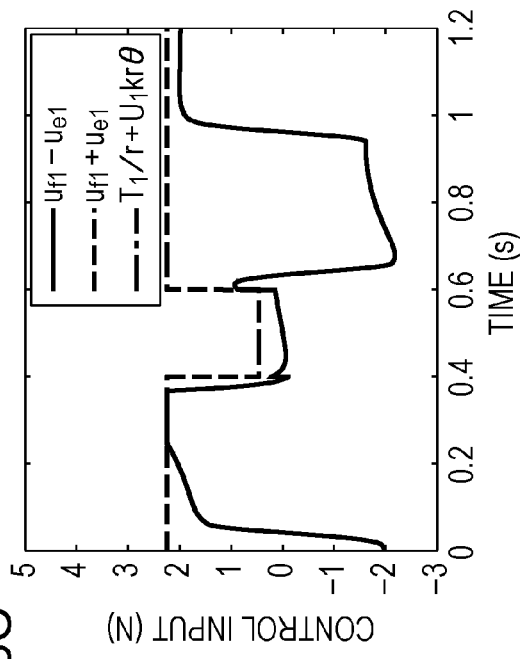

Next, simulation was performed with the inertia moment of the link 101 increased to 1.2 times, to verify the robustness of the control system. FIGS. 8A through 8D illustrate response. It can be seen from FIG. 8A that the joint angle θ follows the target trajectory $r_a$ precisely even if the inertia moment changes due to passivity. It can be seen from FIG. 8D that the feedback control system compensates for change in the inertia moment. The joint torque $T_1$ reaches the torque restriction indicated by the broken line by control input of the feedback control system, and torque is restricted around 0.3 seconds. Thus, the feature that the force of the actuators $e_1$ and $f_1$ is generated only in the tensile direction (contractile direction) is guaranteed, and it can be seen from FIG. 8B that the properties of the generated force command values $u_{e1}$ and $u_{f1}$ only assuming positive values are satisfied. Thus, even if the parameters to be controlled change, $u_{f1}+u_{e1}=U_1$ indicated by the broken line in FIG. 8C is 2.3 in the acceleration zone up to 0.35 seconds and the deceleration zone after 0.45 seconds, and 0.8 in the constant velocity zone, so it can be seen that the stiffness of the joint J1 is being controlled to the target values.

Thus, it can be seen from the first embodiment that highly precise trajectory tracking control and stiffness control due to viscoelasticity of muscles can be realized at the same time, without including an integrator in the feedback control system.

Second Embodiment

Figure 9:
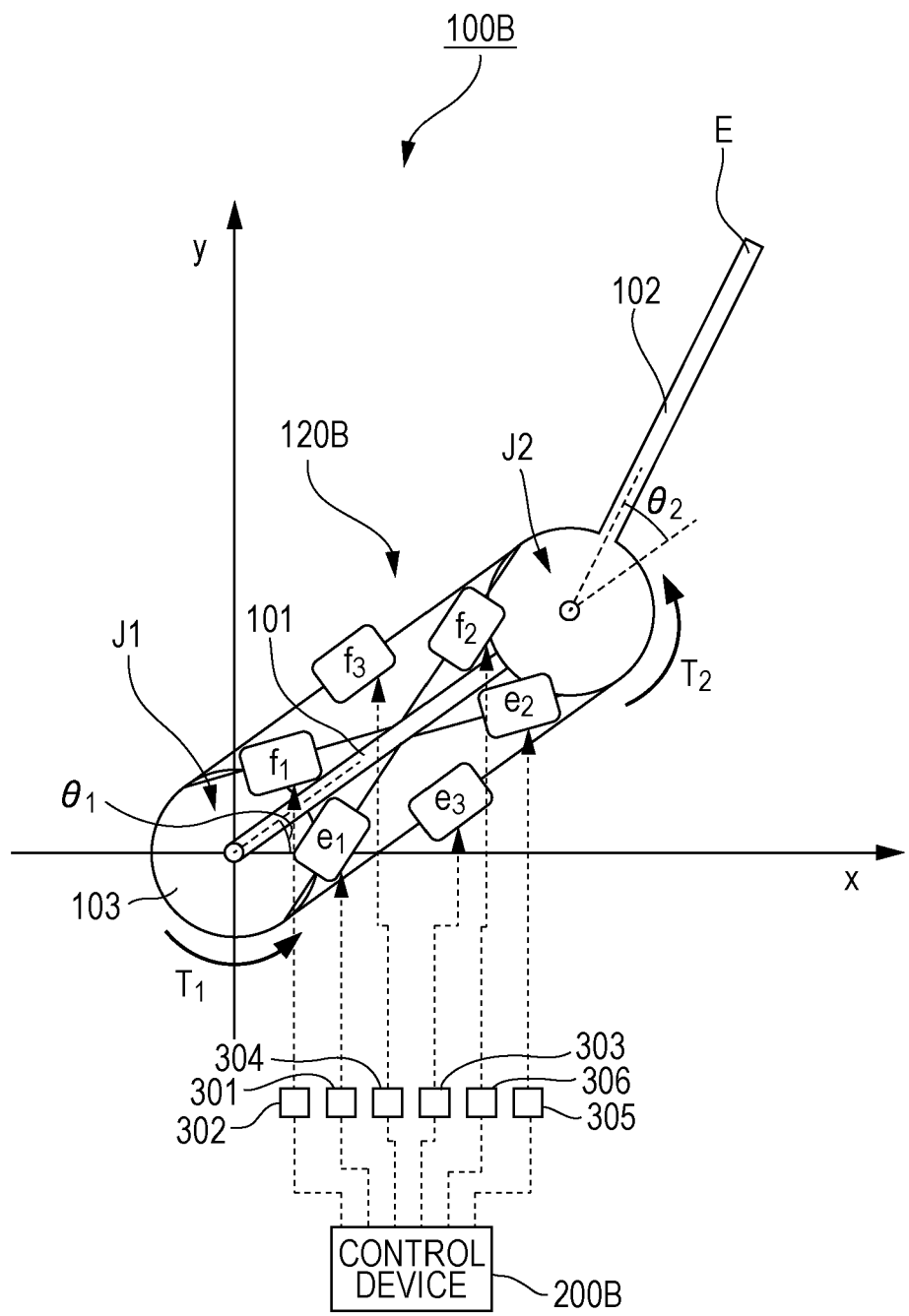
FIG. 9 is a schematic diagram illustrating a robot device according to a second embodiment.

Next, description will be made regarding a robot device according to a second embodiment of the present invention.
1. Modeling FIG. 9 is a schematic diagram illustrating a robot device according to the second embodiment. The robot device 100B includes a manipulator 120B, a control device 200B and six drivers 301 through 306.

The manipulator 120B is a "three-pair six-muscle model" two-link manipulator, having a link (first link) 101 rotatably linked to the base 103 by a joint (first joint) J1, and a link (second link) 102 rotatably linked to the link 101 by a joint (second joint) J2.

The manipulator 120B also includes a pair of actuators $e_1$ and $f_1$ disposed on either side of the link 101 so as to rotationally drive the link 101 on the joint J1. The manipulator 120B further includes a pair of actuators $e_2$ and $f_2$ disposed on either side of the link 102 so as to rotationally drive the link 102 on the joint J2. Moreover, the manipulator 120B includes a pair of actuators $e_3$ and $f_3$ disposed on either side of the links 101 and 102 so as to rotationally drive the links 101 and 102 on the joints J1 and J2 at the same time.

The pair of actuators $e_3$ and $f_3$ are bi-articular simultaneously driving actuators disposed to drive the link 101 and link 102 at the same time. The human body is known to include bi-articular simultaneously driving actuators in the upper arms and thighs called bi-articular muscles. While the array of muscles in human limbs is complicated, a working concept of the muscles has been introduced to propose a two-link model according to a "three-pair six-muscle model" such as illustrated in FIG. 9. Note that actuators which drive a single link, such as the antagonistic pair of actuators $e_1$ and $f_1$ and the antagonistic pair of actuators $e_2$ and $f_2$, are called mono-articular driving actuators.

The actuators $e_1$, $f_1$, $e_2$, $f_2$, $e_3$, and $f_3$ are actuators having the muscle viscoelastic properties illustrated in FIG. 1 as described in the first embodiment. That is to say, the actuators $e_1$, $f_1$, $e_2$, $f_2$, $e_3$, and $f_3$ are modeled after parallel connection of a force generating element, an elastic element, and a viscosity element, and only generate tensile force (contractile force). In the second embodiment, simultaneous control of joint angle and stiffness is performed on the two-link manipulator 120B.

The control device 200B generates generated force command values $u_{e1}$, $u_{f1}$, $u_{e2}$, $u_{f2}$, $u_{e3}$, and $u_{f3}$ corresponding to the actuators $e_1$, $f_1$, $e_2$, $f_2$, $e_3$, and $f_3$. The control device 200B then outputs the generated force command values $u_{e1}$, $u_{f1}$, $U_{e2}$, $u_{f2}$, $U_{e3}$, and $u_{f3}$ to the drivers 301 through 306, thereby controlling the generated force of the actuators $e_1$, $f_1$, $e_2$, $f_2$, $e_3$, and $f_3$. The drivers 301 through 306 generate at the actuators $e_1$, $f_1$, $e_2$, $f_2$, $e_3$, and $f_3$ the generated force corresponding to the generated force command values $u_{e1}$, $u_{f1}$, $u_{e2}$, $u_{f2}$, $u_{e3}$, and $u_{f3}$.

Let us say that $u_{en}$ and $u_{fn}$ (n=1, 2, 3) are generated forces of force generating elements (generated force command values), and $k_{en}$, $k_{fn}$, $b_{en}$, and $b_{fn}$ (n=1, 2, 3) are elastic constants and viscosity constants of the actuators. We will also say that the rotational angles of the links 101 and 102 (e.g., the joint angles of the joints J1 and J2) are $\theta_1$ and $\theta_2$. We will further say that the inertia moments of the links 101 and 102 are $I_1$ and $I_2$, the lengths of the links 101 and 102 are $l_1$ and $l_2$, and the mass of the links 101 and 102 are $m_1$ and $m_2$. The moment arm radius is r for both the links 101 and 102. The mass of an end effector, situated at a tip E of the link 102 but omitted from illustration in FIG. 9, is $m_e$. If we say that the elastic constant and viscosity constant of the muscles are k and b respectively in the second embodiment, the motion equation is as follows.

$$(m_1 l_1^2 + I_1 + 4m_2 l_1^2 + 4m_2 l_1 l_2 \cos\theta_2 + \\ m_2 l_2^2 + I_2 + m_e(8 l_1 l_2 \cos\theta_2 + 4 l_1^2 + 4 l_2^2))\ddot{\theta}_1 + \\ (m_2 l_2^2 + I_2 + 2m_2 l_1 l_2 \cos\theta_2 + m_e(4 l_1 l_2 \cos\theta_2 + 4 l_2^2))\ddot{\theta}_2 - \\ (2m_2 l_1 l_2 (2\dot{\theta}_1 + \dot{\theta}_2) + 4m_e l_1 l_2 (2\dot{\theta}_1 + \dot{\theta}_2))\sin\theta_2 \dot{\theta}_2 = \\ (u_{f1} - u_{e1})r - (u_{f1} + u_{e1})kr^2 \theta_1 - (u_{f1} + u_{e1})br^2 \dot{\theta}_1 + \\ (u_{f3} - u_{e3})r - (u_{f3} + u_{e3})kr^2(\theta_1 + \theta_2) - (u_{f3} + u_{e3})br^2(\dot{\theta}_1 + \dot{\theta}_2) \quad (17)$$

$$(m_2 l_2^2 + I_2 + 2m_2 l_1 l_2 \cos\theta_2 + m_e(4 l_1 l_2 \cos\theta_2 + 4 l_2^2))\ddot{\theta}_1 + \\ (m_2 l_2^2 + I_2 + 4m_e l_2^2)\ddot{\theta}_2 + (2m_2 l_1 l_2 + 4m_e l_1 l_2)\sin\theta_2 \dot{\theta}_1^2 = \\ (u_{f2} - u_{e2})r - (u_{f2} + u_{e2})kr^2 \theta_2 - (u_{f2} + u_{e2})br^2 \dot{\theta}_2 + \\ (u_{f3} - u_{e3})r - (u_{f3} + u_{e3})kr^2(\theta_1 + \theta_2) - (u_{f3} + u_{e3})br^2(\dot{\theta}_1 + \dot{\theta}_2) \quad (18)$$

2. Control Design

Figure 10:
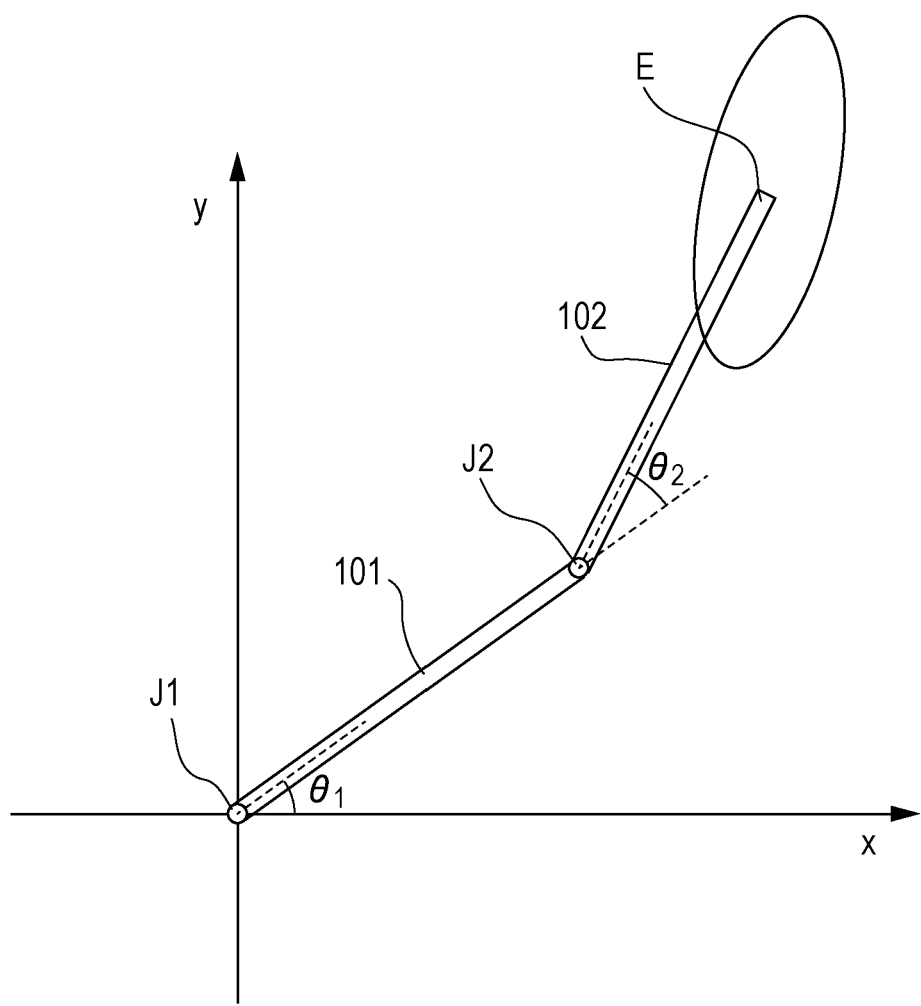
FIG. 10 is a diagram for describing a stiffness ellipse according to the second embodiment.

Simultaneous control of the angles and stiffness of the joints J1 and J2 is performed in the second embodiment, in the same way that simultaneous control of the angle of the joint J1 was performed in the first embodiment. Note however, that the end effector E, which is the tip of the link 102 of the two-link manipulator 120B comes into direct contact with the outside world, so control of the stiffness of the end effector E is important. The stiffness of the end effector E is expressed by a stiffness ellipse such as illustrated in FIG. 10. This ellipse represents the distribution of stiffness in various directions, and indicates that the greater the distance between the end effector E and the ellipse is, the greater the stiffness is.

Figure 11:
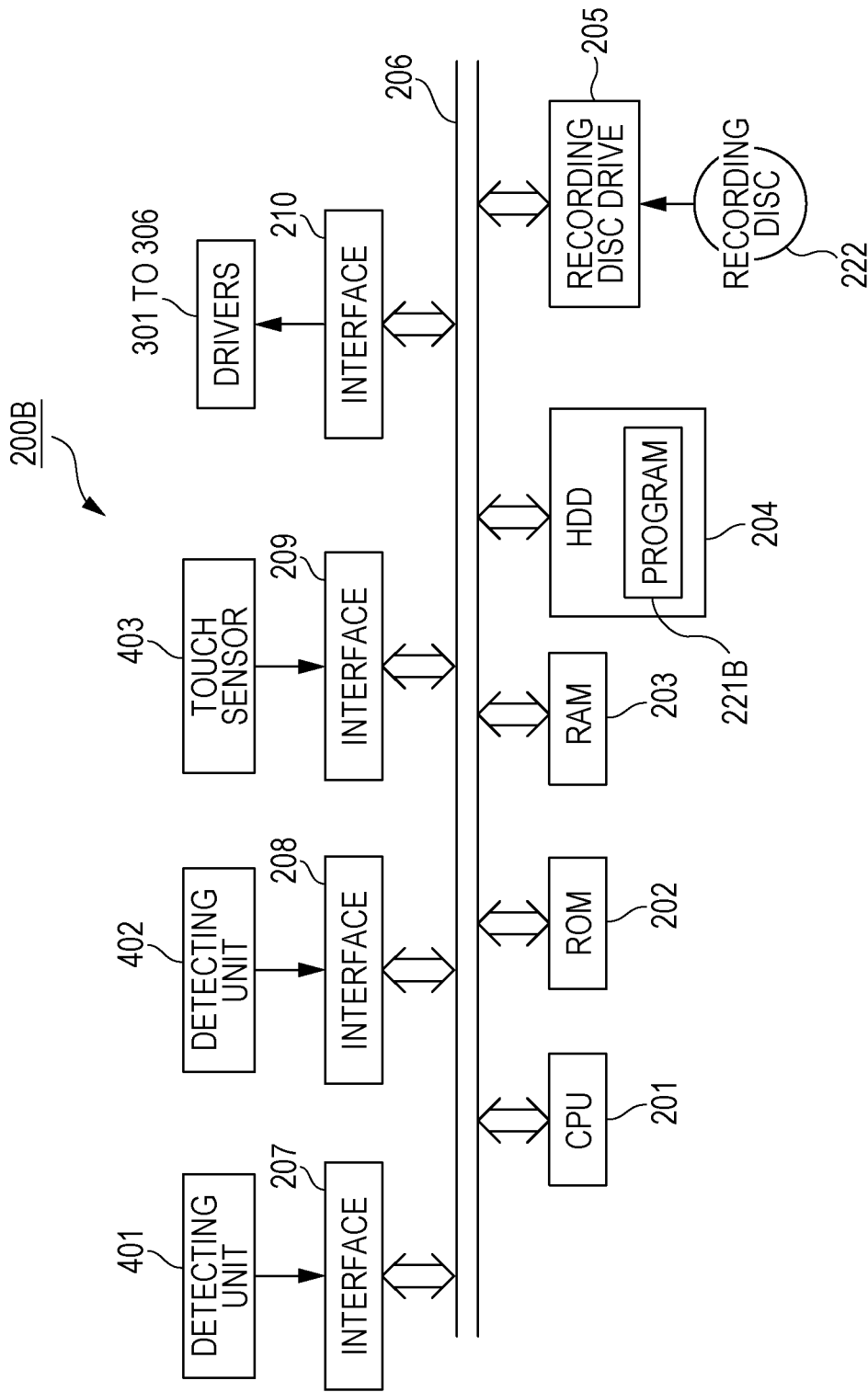
FIG. 11 is a block diagram illustrating a configuration of a control device according to the second embodiment.

FIG. 11 is a block diagram illustrating the configuration of the control device 200B. The control device 200B is configured as a computer, including a CPU 201 serving as a control unit (computing unit) ROM 202, RAM 203, an HDD 204, a recording disk drive 205, and various interfaces 207, through 210, in the same way as with the first embodiment described above.

The CPU 201 has connected thereto the ROM 202, RAM 203, HDD 204, recording disk drive 205, and various interfaces 207, through 210, via a bus 206. The CPU 201 executes various types of computation processing based on a program 221B recorded in the HDD 204.

The aforementioned drivers 301 through 306 are connected to the interface 210. The CPU 201 outputs the generated force command values $u_{e1}$, $u_{f1}$, $e_{e2}$, $u_{f2}$, $u_{e3}$, and $u_{f3}$ to the drivers 301 through 306 via the bus 206 and interface 210. Thus, the drivers 301 through 306 generate generated force at the actuators $e_1$, $f_1$, $e_2$, $f_2$, $e_3$, and $f_3$, corresponding to the generated force command values that have been input.

In the second embodiment, the robot device 100B includes a detecting unit 401 which is a first detecting unit, and a detecting unit 402 which is a second detecting unit, omitted from illustration in FIG. 9, and a touch sensor 403. The detecting unit 401 is disposed at the joint J1 in FIG. 9, and detects the joint angle $\theta_1$ of the joint J1 (first joint angle). The detecting sensor 402 is disposed at the joint J2 in FIG. 9, and detects the joint angle $\theta_2$ of the joint J2 (second joint angle). The touch sensor 403 is disposed on the link 101 or link 102, and detects whether or not an object has come into contact with the link 101 or link 102.

The detecting unit 401 is connected to the interface 207, so that a signal indicating the detected joint angle $\theta_1$ is transmitted to the CPU 201 via the interface 207 and bus 206. The detecting unit 402 is connected to the interface 208, so that a signal indicating the detected joint angle $\theta_2$ is transmitted to the CPU 201 via the interface 208 and bus 206. The touch sensor 403 is connected to the interface 209, so that a signal indicating whether or not there has been contact is transmitted to the CPU 201 via the interface 209 and bus 206.

Figure 12:
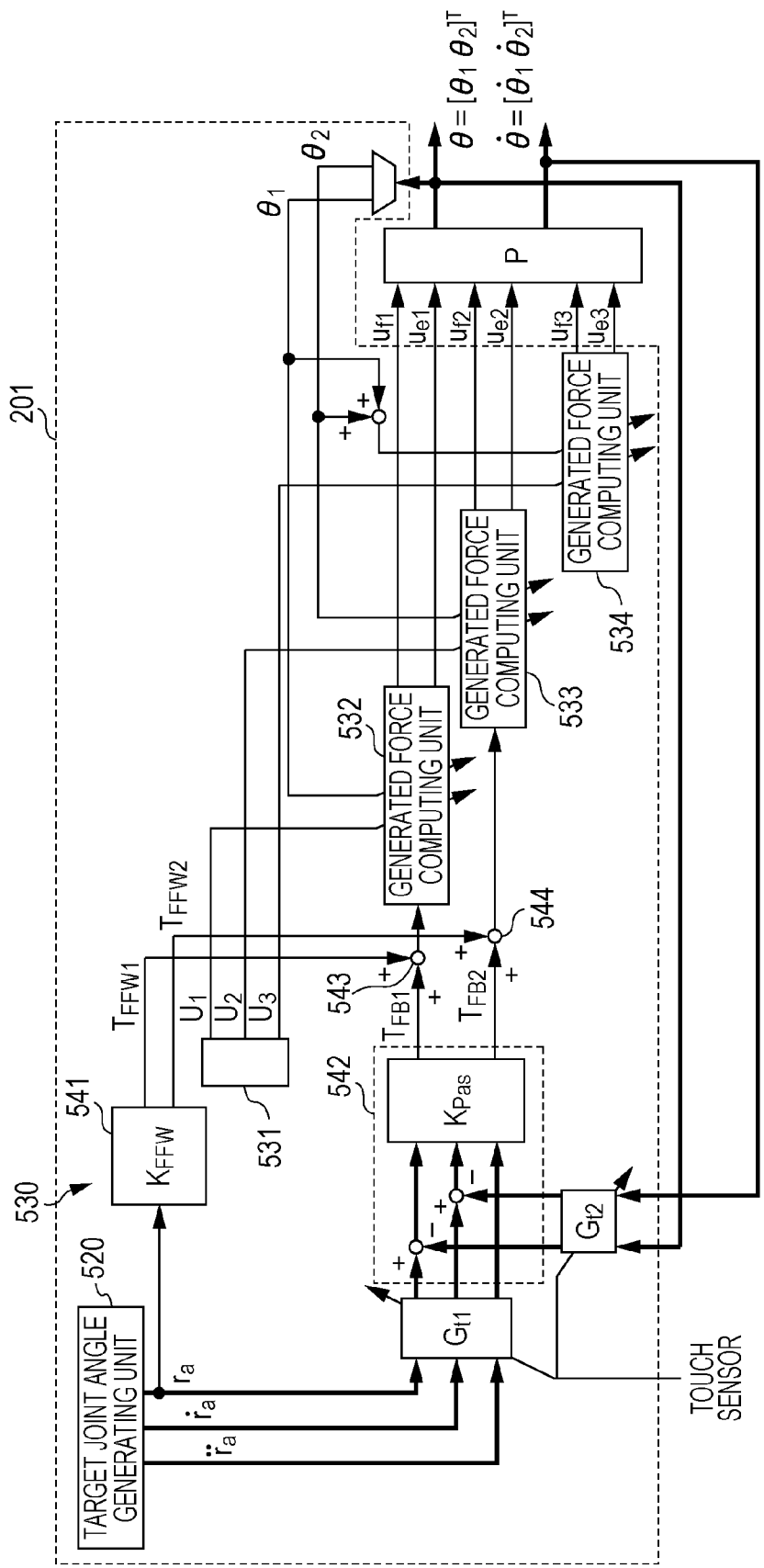
FIG. 12 is a functional block line diagram for describing control operations of a CPU according to the second embodiment.

FIG. 12 is a functional block line diagram for describing control operations of the CPU 201. A robot control method will be described with reference to FIG. 12. Note that in FIG. 12, the manipulator 120B is denoted by reference symbol P. The CPU (control unit) 201 of the control device 200B functions as each part illustrated in FIG. 12 by reading out the program 221B from the HDD 204 and executing the program 221B.

That is to say, the CPU 201 functions as a target joint angle generating unit 520 based on the program 221B. The CPU 201 also functions as a joint torque computing unit 530 which executes joint torque computation processing, and a summing unit 531 which executes summing processing, based on the program 221B. The CPU 201 further functions as generated force computing units 532, 533, and 534 which execute elastic torque computation processing, restriction processing, and generated force computing processing, based on the program 221B.

The target joint angle generating unit 520 executes target joint angle generating processing to generate a target joint angle of the joint J1 (first target joint angle) $r_{a1}$ and a target joint angle of the joint J2 (second target joint angle) $r_{a2}$, based on the target trajectory of the tip E of the link 102.

The joint torque computing unit 530 executes computation processing generally the same as the joint torque computing unit 230 in the first embodiment described above. The summing unit 531 executes computation processing generally the same as the summing unit 231 in the first embodiment described above. The generated force computing units 532 and 533 execute computation processing generally the same as the units 233, 234, and 235 in the first embodiment described above. The joint torque computing unit 530 has feed-forward computing unit 541, a feedback computing unit 542, and adding units 543 and 544, in the same way as the first embodiment described above.

2.1 Viscoelastic Force Compensation

The control method of the actuators $e_1$ and $f_1$, and actuators $e_2$ and $f_2$, which are mono-articular driving actuators, is generally the same as with the first embodiment. The feedback control system $K_{Pas}$ and feed-forward control system $K_{FFW}$ calculate $$T_n = T_{FBn} + T_{FFWn} (n=1,2)$$

regarding the links 101 and 102, as joint torque (control input torque) $T_n$ to compensate for error between the joint angle $\theta_n$ (n=1, 2) and target angle $r_{an}$ (n=1, 2).

If we represent the sum value of generated force command values as $U_n$ in the same way as with the first embodiment described above, this can be expressed as follows.

$$(u_{fn} - u_{en})r = T_n + T_{PCn} = T_n + kr^2 U_n \theta_n, n=1,2 \tag{19}$$

$$u_{fn} + u_{en} = U_n, n=1,2 \tag{20}$$

Solving this in the same way as with the first embodiment yields the following.

$$u_{fn} = \frac{U_n(1 + kr\theta_n) + T_n/r}{2},$$

$$u_{en} = \frac{U_n(1 - kr\theta_n) - T_n/r}{2}, \tag{21}$$

$$n = 1, 2$$

The joint torque (control input torque) $T_n$ (n=1, 2) is restricted as in the following.

$$-U_n r(1+kr\theta_n) < T_n < U_n r(1-kr\theta_n), n=1,2 \tag{22}$$

In the second embodiment, the joints J1 and J2 are given stiffness using the actuators $e_3$ and $f_3$ which are bi-articular simultaneous driving actuators, in addition to the mono-articular driving actuators. We will say that the sum value of the generated force command values $u_{e3}$ and $u_{f3}$ of the actuators $e_3$ and $f_3$ is $U_3$. Further, the joints J1 and J2 can be given torque in the same way as with the mono-articular driving actuators by providing the generated force command values $u_{e3}$ and $u_{f3}$ of the actuators $e_3$ and $f_3$ is $U_3$ with difference. That is to say, the CPU 201 which is the control unit (the generated force computation unit 534) calculates the generated force command values $u_{e3}$ and $u_{f3}$ so as provide the joints J1 and J2 with torque based on the difference in generated force command values $u_{e3}$ and $u_{f3}$ as to the actuators $e_3$ and $f_3$ ($u_{f3} - u_{e3}$). In doing so, the generated force command values $u_{e3}$ and $u_{f3}$ are calculated so as to cancel the generated force of the elastic element by the joint torque of the actuators $e_3$ and $f_3$ during time periods where there is no contact and no stiffness is needed at the end effectors E. Let us say that the following holds.

$$u_{f3} - u_{e3} = U_3 kr^2(\theta_1 + \theta_2) \tag{23}$$

$$u_{f3} + u_{e3} = U_3 \tag{24}$$

Solving this yields the generated force command values $u_{e3}$ and $u_{f3}$ as follows.

$$u_{f3} = \frac{U_3(1 + kr^2(\theta_1 + \theta_2))}{2}, \quad (25)$$

$$u_{e3} = \frac{U_3(1 - kr^2(\theta_1 + \theta_2))}{2}$$

Restriction is thus effected as follows.

$$-U_3 r(1+kr(\theta_1+\theta_2)) < T_3 < U_3 r(1-kr(\theta_1+\theta_2)) \quad (26)$$

2.2 Robust Control

Figure 13:
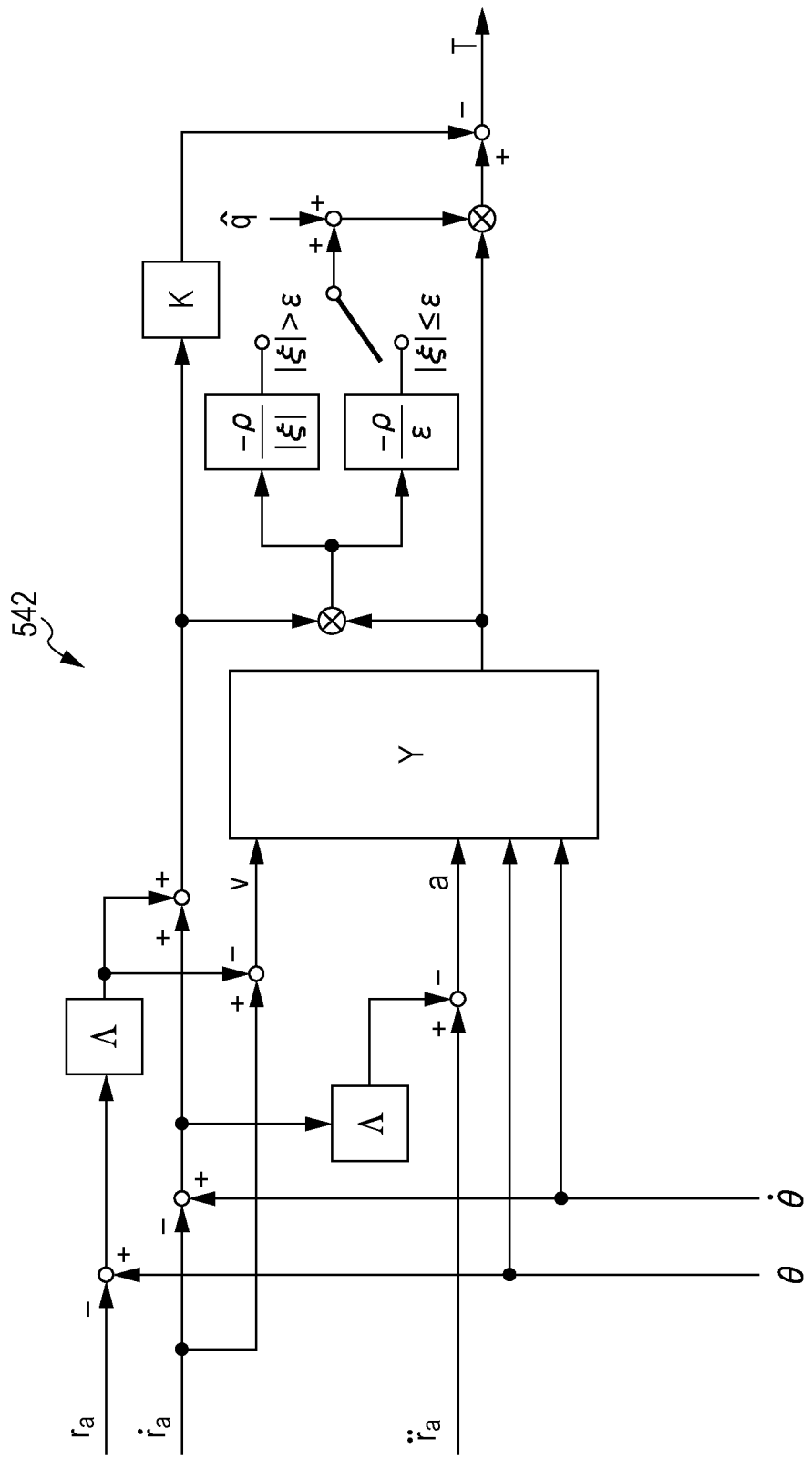
FIG. 13 is a block line diagram of a feedback computing unit in FIG. 12.

A PD control system has been applied to the first embodiment as a control system based on passivity. However, many robust control techniques based on passivity have been proposed for two-link manipulators, and robust capabilities can be provided to the control system in addition to robust stability based on passivity. Such robust control can be applied to a bi-articular muscle manipulator by using the above-described viscoelasticity compensation. In the second embodiment, the feedback computing unit 542 is configured as the feedback control system illustrated in FIG. 13. In FIG. 13, v and a are auxiliary vectors, and the following holds $$v = \dot{q}^d - \Lambda \tilde{q}, a = \ddot{q}^d - \Lambda \dot{\tilde{q}} \quad (27)$$

where $$q^d = [r_{a1} r_{a2}]^T, \tilde{q} = [\theta_1 \theta_2]^T - q_d = q - q_d \quad (28)$$

and $$r_p = [\dot{\theta}_1 \dot{\theta}_2]^T - v \quad (29)$$

hold.

Y is a matrix called a regressor where $$Y(q, \dot{q}, v, a) = \quad (30)$$

$$\begin{bmatrix} a_1 & a_1 + a_2 & (2a_1 + a_2)\cos\theta_2 - (\theta_2 v_2 + \theta_1 v_2 + \theta_2 v_1)\sin\theta_2 \\ 0 & a_1 + a_2 & a_1 \cos\theta_2 - \dot{\theta}_1 v_1 \sin\theta_2 \end{bmatrix}$$

holds.

This is used to define as follows $$\xi = Y(q, \dot{q}, v, a) r \quad (31)$$

Defining $u_p$ here as $$u_p = \begin{cases} -\rho_i \frac{\xi_i}{|\xi_i|} & (|\xi_i| > \varepsilon_i) \\ -\frac{\rho_i}{\varepsilon_i} \xi_i & (|\xi_i| \le \varepsilon_i) \end{cases} \quad (32)$$

yields feedback control torque $T_{FBn}$ as follows.

$$T_{FBn} = Y(q, \dot{q}, v, a)(\hat{\theta}_p + u_p) - K r_p \quad (33)$$

$\hat{\theta}_p$ can be obtained from the range of change in the following parameter vector.

$$\theta_p = \begin{bmatrix} m_1 r_1^2 + (m_2 + m_e)l_1^2 + I_1 \\ (m_2 + m_e)\hat{r}_2^2 + \hat{I}_2 \\ 2(m_2 + m_e)l_1 \hat{r}_2 \end{bmatrix} \quad (34)$$

Note that $\hat{r}_2, \hat{I}_2$ is the distance and inertia moment to the center of gravity when considering the link 102 and end effector to be a single rigid body. κ, K, and ε are design parameters.

2.3 End Effector Stiffness Control

The one-link manipulator 120 according to the first embodiment above was described as the stiffness of the joint J1 and the stiffness of the end effector being the same. The stiffness of the end effector E of the "three-pair six-muscle model" two-link manipulator 120B is obtained by controlling the generated force sums $U_1$, $U_2$, and $U_3$. It is known that by controlling the generated force sums $U_1$, $U_2$, and $U_3$ so that $$U_1 = U_2 = U_3 \quad (35)$$

the long axis of the stiffness ellipse is aligned in a direction connecting the joint J1 and the end effector E.

Alternatively, generated force sums $U_1$, $U_2$, and $U_3$ may be obtained so that the long and short axes of the stiffness ellipse of the end effector E are parallel to the x and y axes.

2.4 Trajectory Design

In the second embodiment, the end effector E drives the target trajectory in parallel to the y axis. Further, the second embodiment uses a trajectory having an acceleration zone, a constant velocity zone, and a deceleration zone, in the same way as with the first embodiment. The target trajectories $r_{a1}$ and $r_{a2}$ as to the joint angles $\theta_1$ and $\theta_2$ are obtained from the end effector trajectory by inverse kinematics.

Next, the target stiffness is set so as to satisfy Expression (35), with the long axis of the stiffness ellipse aligned in a direction connecting the joint J1 and the end effector E at the target position of the end effector E. Also, settings are made such that stiffness is high in the acceleration zone and stiffness is low in the constant velocity zone. We will say that the sum of generated force of the mono-articular actuator in the acceleration zone is $U_{nmax}$ (n=1, 2, 3), and the sum of generated force of the mono-articular actuator in the constant velocity zone is $U_{nmin}$ (n=1, 2, 3).

In the second embodiment, trajectory having an acceleration zone, a constant velocity zone, and a deceleration zone has been described, but a trajectory not having a constant velocity zone, such as a minimum jerk trajectory for example, may be used. Further, the target stiffness may be constant in a case where efficiency of driving is not taken into consideration.

(3) Simulation

Simulation was performed using the control system described above. The physical parameters of the link 101 and link 102 are the same. The length of the links 101 and 102 was 0.2 m, the inertia moment of the links 101 and 102 was set to $I_1 = I_2 = 1.3 \times 10^{-3}$ kgm$^2$, the moment arm radius to r=0.05 m, and the elastic constant and viscosity constant to k=12 and b=0.003, respectively. The target trajectory was set such that constant velocity zone starting time $t_a$=0.2747 seconds, constant velocity zone ending time $t_b$=0.4767 seconds, and positioning ending time $t_{fin}$=0.75 seconds. The generated force sums $U_1$, $U_2$, and $U_3$ of the actuators were controlled such that the stiffness ellipse of the end effector E was aligned in a direction connecting the joint J1 and the end effector E. Accordingly, $U_{nmax}$=4 and $U_{nmin}$=2 (n=1, 2, 3) were set.

Figure 14A:
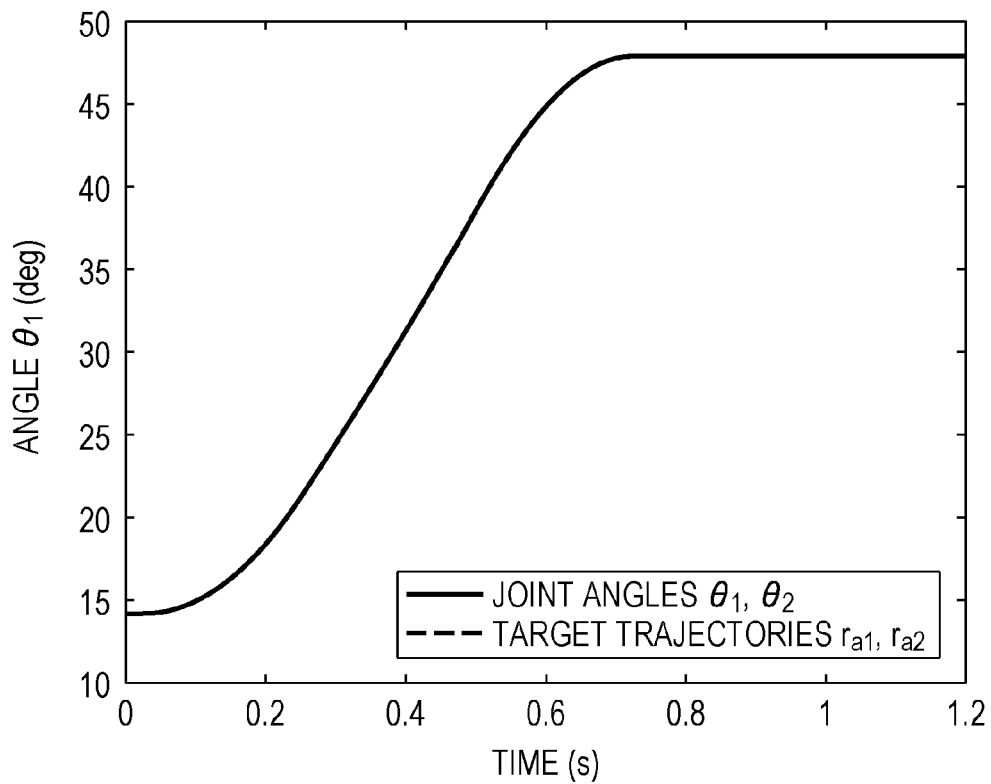
FIGS. 14A and 14B are diagrams illustrating simulation results according to the second embodiment.
Figure 14B:
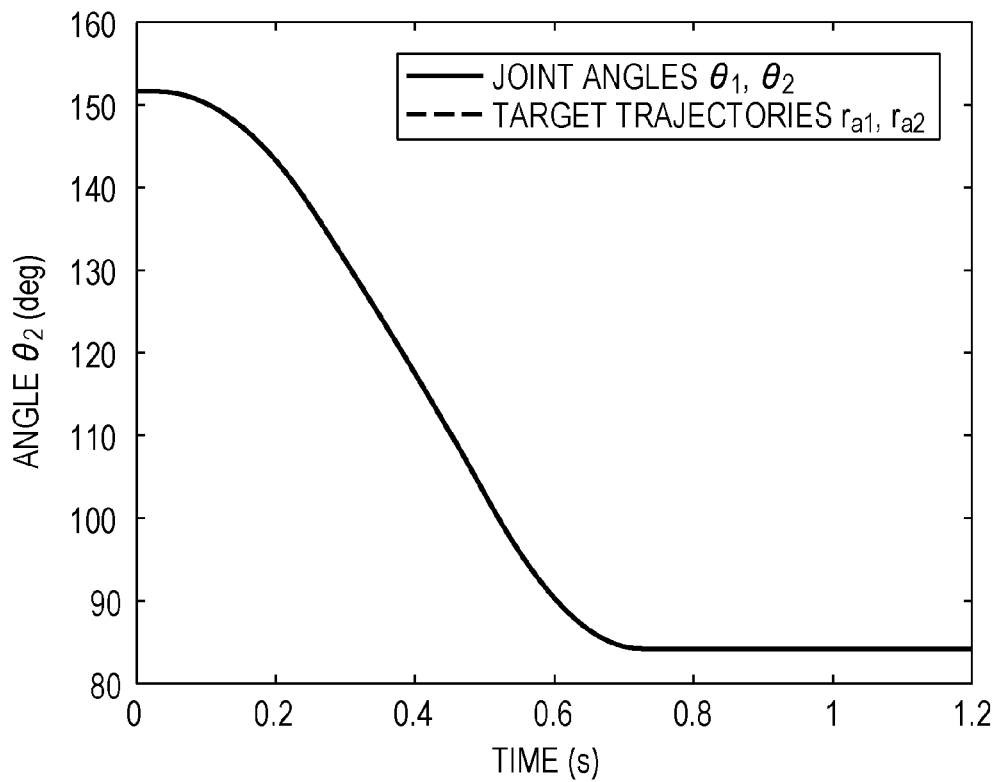
Figure 15A:
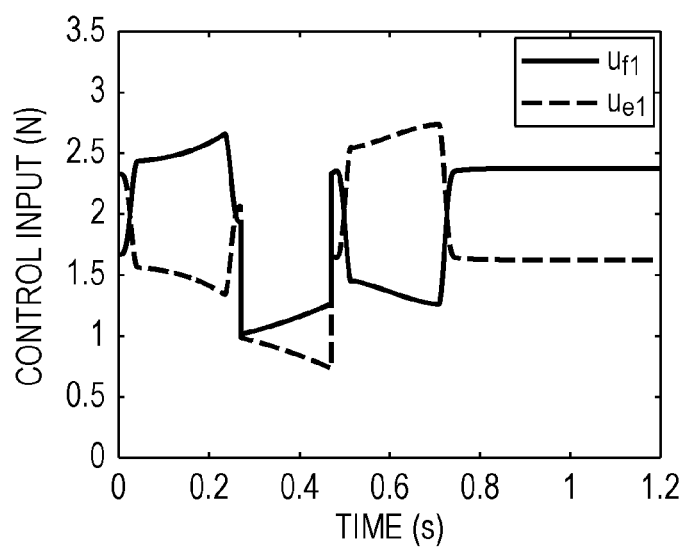
FIGS. 15A through 15C are diagrams illustrating simulation results according to the second embodiment.
Figure 15B:
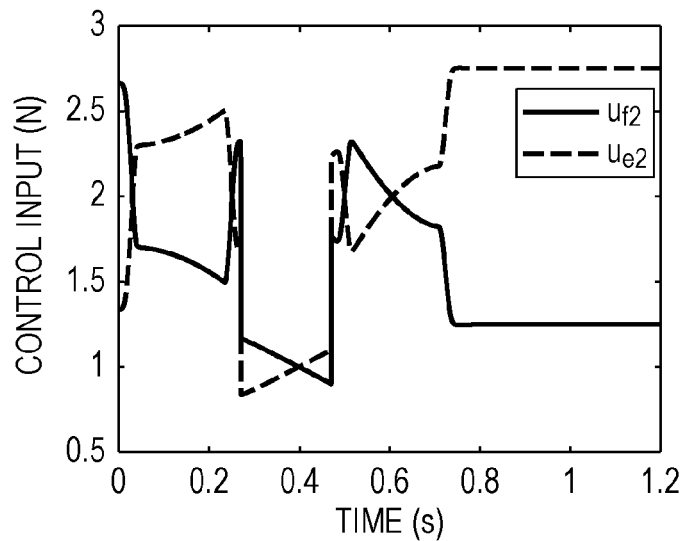
Figure 15C:
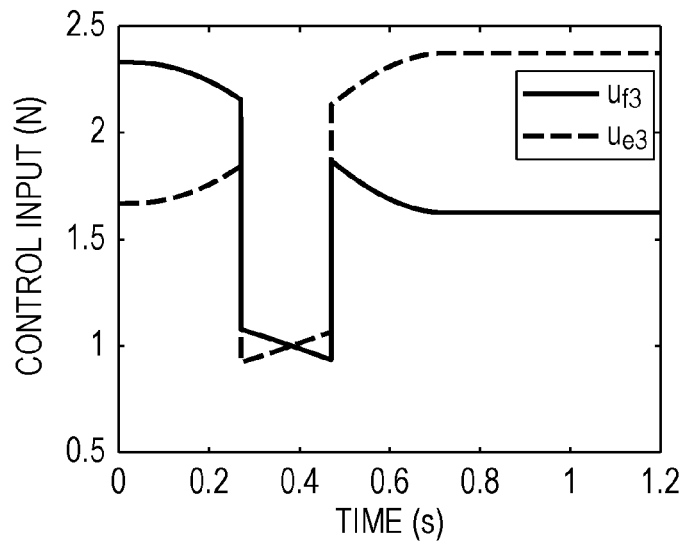

FIGS. 14A and 14B illustrate the joint angles $\theta_1$ and $\theta_2$ of the links 101 and 102 by solid lines, and target trajectories $r_{a1}$ and $r_{a2}$ by broken lines, respectively. FIGS. 15A through 15C illustrate the response of generated force command values $u_{f1}$, $u_{f2}$, and $u_{f3}$, by solid lines, and the response of generated force command values $u_{e1}$, $u_{e2}$, and $U_{e3}$, by broken lines. Further, FIG. 16 illustrates the sums of the generated force command values $u_{en}$ and $u_{fn}$ (n=1, 2, 3) by a solid line, broken line, and single-dot broken line, respectively.

It can be seen from FIGS. 14A and 14B that the joint angles $\theta_1$ and $\theta_2$ illustrated by solid lines overlap the trajectories illustrated by broken lines, meaning that the links 101 and 102 are following the target trajectory. It can be seen from the response of the links 101 and 102 in FIGS. 15A and 15B that the generated force command values $u_{e1}$ and $u_{f1}$ and generated force command values $u_{e2}$ and $u_{f2}$ distribute the respective joint torques $T_1$ and $T_2$ according to the conditions given in Expression (21). It can also be seen from FIG. 15C that the generated force command values $u_{e3}$ and $u_{f3}$ distribute the torques for compensating elasticity according to the conditions given in Expression (25).

Figure 16:
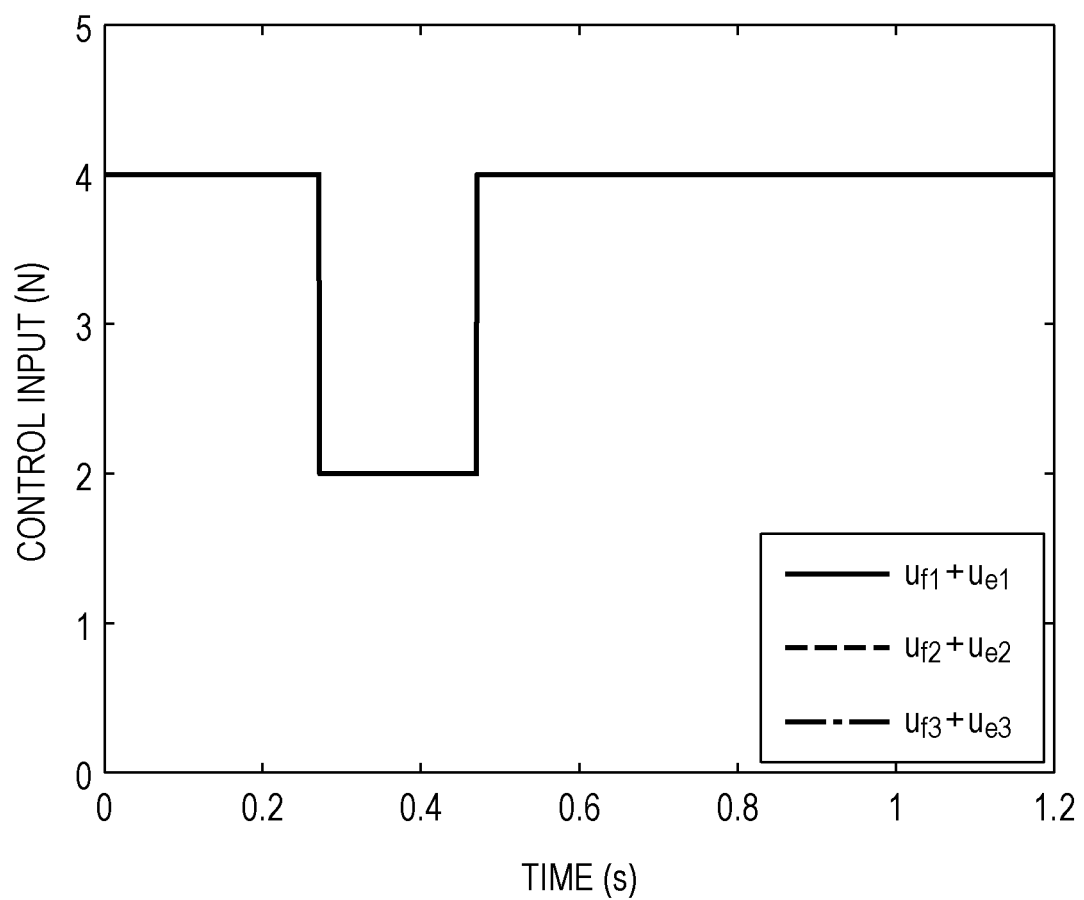
FIG. 16 is a diagram illustrating simulation results according to the second embodiment.

In FIG. 16, the $u_{fn}+u_{en}$ (n=1, 2, 3) illustrated by a solid line, broken line, and single-dot broken line, are all at 4 in the acceleration zone and 2 in the constant velocity zone. Thus, it can be seen that the stiffness of the antagonistic pairs is controlled by the target stiffness, and accordingly the stiffness ellipse of the end effector E is controlled in the direction connecting the joint J1 and the end effector E.

Figure 17A:
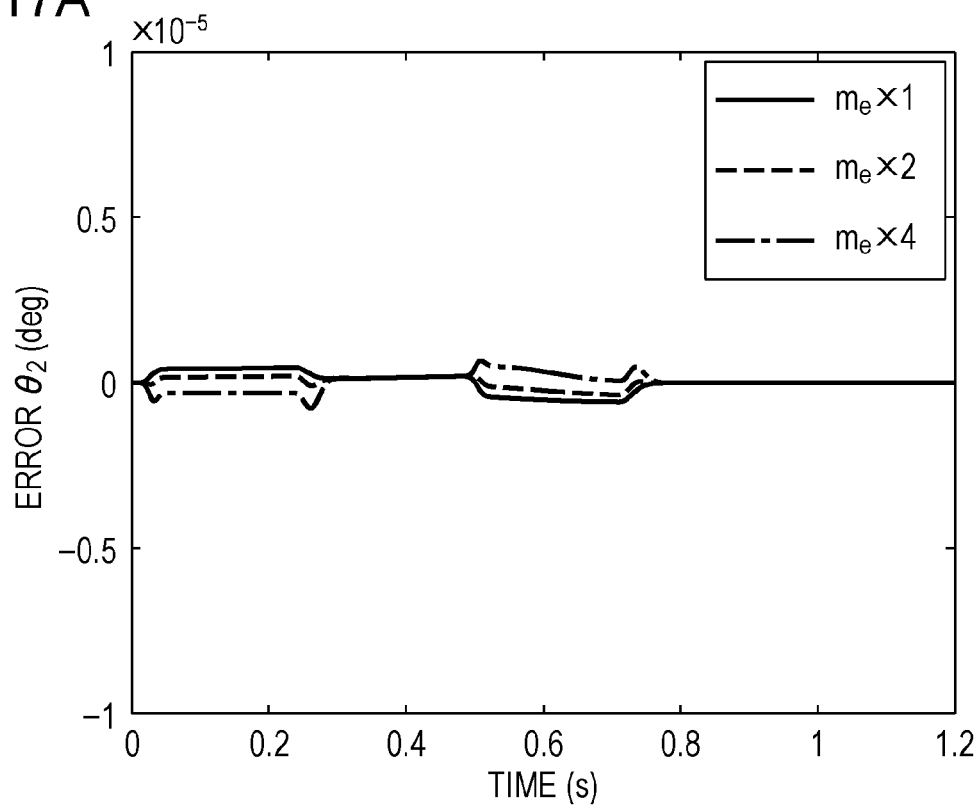
FIGS. 17A and 17B are diagrams illustrating simulation results according to the second embodiment.
Figure 17B:
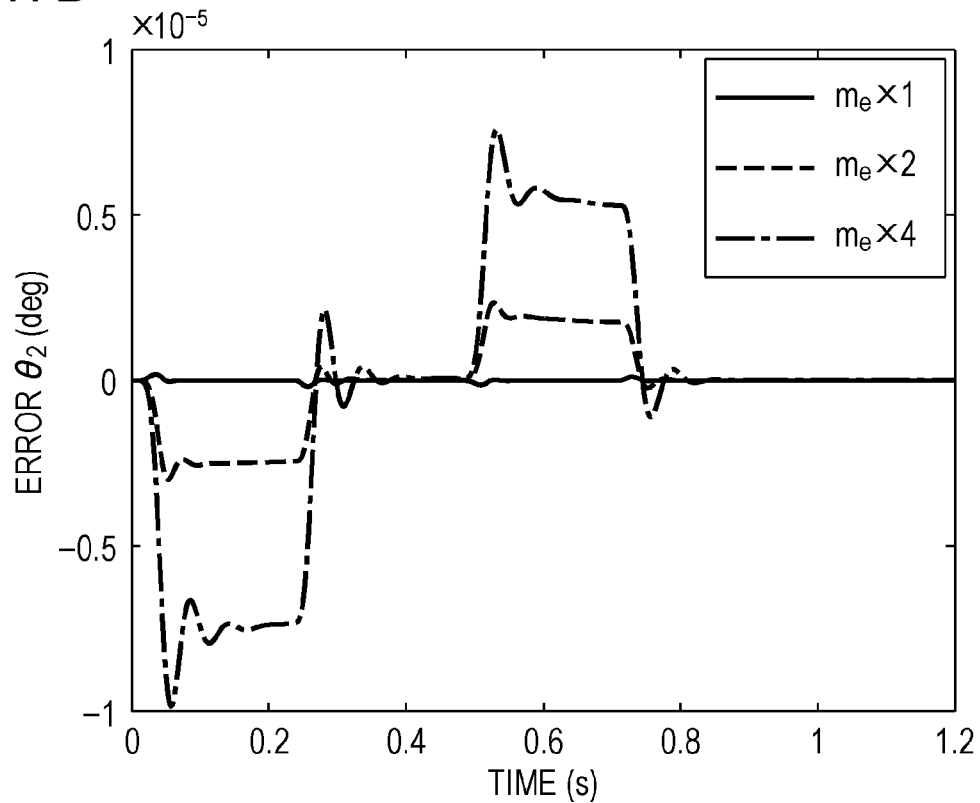

Further, simulation was performed with the end effector mass changed. FIG. 17A illustrates response in positioning error of the link 102 with the end effector mass being changed from one time to two times and four times, by a solid line, broken line, and single-dot broken line, respectively. Also, FIG. 17B illustrates positioning error response of the end effector change simulation using a PD control system for the feedback system. In a case where robust control is used for the feedback control system, there is little degradation in trajectory tracking error even if the end effector mass changes. However, it can be seen that the trajectory positioning error increases in a PD control system as the end effector mass changes.

It can be seen from the control system according to the second embodiment that control of end effector stiffness can be controlled by "three-pair six-muscle model" elasticity while realizing tracking of a target trajectory. Further, robustness based on passivity is exhibited when parameter changes occur in end effector mass and the like, whereby degradation in trajectory tracking control capabilities can be prevented.

Note that the present invention is not restricted to the above-described embodiments, and that various modifications may be made by one with ordinary skill in the art without departing from the technical idea of the present invention.

The processing operations of the above embodiments are specifically executed by the CPU 201 serving as the control unit of the control devices 200 and 200B. Accordingly, a recording medium in which is recorded a program for realizing the above-described functions may be supplied to a control device, and the computer (CPU or MPU) of a the control device reading out and executing the program stored in the recording medium, so as to achieve the same results. In this case, the program itself read out from the recording medium realizes the functions of the embodiments described above, and the program itself and the recording medium recording the program make up the present invention.

Also, a case has been described in the above embodiments where the computer-readable recording medium is the HDD 204 and the programs 221 and 221B are stored in the HDD 204, but the present invention is not restricted to this arrangement. The programs may be recorded in any recording medium as long as a computer-readable recording medium. Examples of recording mediums for supplying the program include the ROM 202 and recording disc 222 illustrated in FIGS. 3 and 11, an external storage device not illustrated, and so forth. Specific examples which may be used as a recording medium include a flexible disk, hard disk, optical disc, magneto-optical disc, CD-ROM, CD-R, magnetic tape, rewritable non-volatile memory (e.g., USB memory), ROM, or the like.

Also, a the programs according to the above-described embodiments may be downloaded over a network and executed by a computer.

The present invention is not restricted to a computer executing program code which has been read out so as to realize the functions of the above-described embodiments. Also encompassed is a case where an operating system (OS) or the like running on the computer performs part or all of the actual processing based on instructions of the program code, and the functions of the embodiments described above are realized by that processing.

Further, program code read out from a recording medium may be written to a function extension board inserted into the computer or memory in a function extension unit connected to the computer. Also encompassed is a case where a CPU or the like provided to the function extension board or function extension unit performs part or all of the actual processing based on instructions of the program code, and the functions of the embodiments described above are realized by that processing.

The above embodiments have been described with regard to a case where the computer executes by programs recorded in the recording medium such as a HDD or the like, thereby carrying out the functions illustrated in FIGS. 4, 5, and 12, but the present invention is not restricted to this arrangement. Part or all of the functions of the control unit illustrated in FIGS. 4, 5, and 12 may be confirmed as a large-scale integration (LSI) such as an application specific integrated circuit (ASIC) or field-programmable gate array (FPGA).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the preferred embodiments of the present invention described above, control to compensate joint stiffness by elastic elements of actuators enables control based on passivity. Accordingly, if there is no contact occurring at a link, trajectory control with high robust stability as to load change on the link is realized, and when there is contact, desired stiffness is realized by elastic elements of actuators. Accordingly, simultaneous control can be realized for joint angle trajectory tracking control with high robustness and control of end effector flexibility.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-080057 filed Apr. 8, 2013, which is hereby incorporated by reference herein in its entirety.

What is claimed is:

1. A robot device comprising:
a first link rotatably linked to a base by a first joint;
a pair of mono-articular driving actuators disposed on both sides of the first link, to generate tensile forces, and rotationally drive the first link on the first joint; and
a control unit configured to obtain each force command value for each of the pair of mono-articular driving actuators, and thereby control the pair of mono-articular driving actuators,
wherein the control unit executes
joint torque computation processing to obtain joint torque necessary to set a joint angle of the first joint to a target joint angle,
summing processing to obtain a sum value indicating a sum of force command values as to the mono-articular driving actuators, based on a target stiffness of the first joint,
elastic torque computation processing to obtain elastic torque according to elasticity of the mono-articular driving actuators acting on the first joint,
restricting processing to restrict a total value of the joint torque and the elastic torque, so as to satisfy restriction conditions of $|T_1+T_{PC1}|<U_1 \times r$, where $T_1$ represents the joint torque, $U_1$ represents the sum value, $T_{PC1}$ represents the elastic torque, and r represents the moment arm radius of the first link, and
force computation processing to obtain the force command values for each of the pair of mono-articular driving actuators, based on the total value restricted in the restricting processing.

2. The robot device according to claim 1,
wherein the control unit executes, as the joint torque computation processing, feedback computation processing to obtain the joint torque, by feedback computation based on a difference between the joint angle and the target joint angle.

3. The robot device according to claim 1,
wherein the control unit executes, as the joint torque computation processing,
feed-forward computation processing to obtain feed-forward control torque as to the first joint, by feed-forward computation based on the target joint angle,
feedback computation processing to obtain feedback control torque, by feedback computation based on a difference between the joint angle and the target joint angle, and
adding processing to obtain the joint torque by adding the feed-forward control torque to the feedback control torque.

4. The robot device according to claim 2,
wherein the control unit executes, as the feedback computation processing, a PD control to compensate for the difference.

5. The robot device according to claim 3,
wherein the control unit executes, as the feedback computation processing, a PD control to compensate for the difference.

6. The robot device according to claim 1,
wherein the control unit obtains the elastic torque by computing $U_1 \times k \times r^2 \times \theta$ where k represents the elastic constant of the mono-articular driving actuators and $\theta$ represents the joint angle, as the elastic torque computation processing.

7. The robot device according to claim 1, further comprising:
a second link rotatably linked to the first link by a second joint; and
a pair of bi-articular simultaneous driving actuators disposed on both sides of the first link and the second link, to generate tensile forces, and rotationally drive the first link on the first joint and simultaneously rotationally drive the second link on the second joint,
wherein the control unit computes force command values which satisfy restriction of positive values as to the bi-articular simultaneous driving actuators, so as to cancel torque provided to the first joint and the second joint by elasticity of the bi-articular simultaneous driving actuators.

8. A robot control method to control a robot device including
a first link rotatably linked to a base by a first joint,
a pair of mono-articular driving actuators disposed on both sides of the first link, to generate tensile forces, and rotationally drive the first link on the first joint, and
a control unit configured to obtain each force command value as to the mono-articular driving actuators, and control the mono-articular driving actuators,
the method causing the control unit to execute:
a joint torque computation step to obtain joint torque necessary to set the joint angle of the first joint to a target joint angle;
a summing step to obtain a sum value indicating a sum of force command values as to the mono-articular driving actuators, based on a target stiffness of the first joint;
an elastic torque computation step to obtain elastic torque according to elasticity of the mono-articular driving actuators acting on the first joint;
a restricting step to restrict the total value of the joint torque and the elastic torque, so as to satisfy restriction conditions of $|T_1+T_{PC1}|<U_1 \times r$, where $T_1$ represents the joint torque, $U_1$ represents the sum value, $T_{PC1}$ represents the elastic torque, and r represents the moment arm radius of the first link;
a force computation step to obtain the force command values of the mono-articular driving actuators, based on the total value restricted in the restricting step; and
a robot device control step to control the robot device based on the force command values.

9. A control device to control a pair of mono-articular driving actuators, disposed on both sides of a first link rotatably linked to a base by a first joint, to generate tensile forces, and rotationally drive the first link on the first joint;
wherein the control device executes:
joint torque computation processing to obtain joint torque necessary to set a joint angle of the first joint to a target joint angle,
summing processing to obtain a sum value indicating a sum of force command values for each of the pair of mono-articular driving actuators, based on a target stiffness of the first joint,
elastic torque computation processing to obtain elastic torque according to elasticity of the mono-articular driving actuators acting on the first joint, restricting processing to restrict a total value of the joint torque and the elastic torque, so as to satisfy restriction conditions of $|T_1+T_{PC1}|<U_1 \times r$, where $T_1$ represents the joint torque, $U_1$ represents the sum value, $T_{PC1}$ represents the elastic torque, and r represents the moment arm radius of the first link, and force computation processing to obtain the force command values for each of the pair of mono-articular driving actuators, based on the total value restricted in the restricting processing.

10. The control device according to claim 9,
wherein the control unit executes, as the joint torque computation processing, feedback computation processing to obtain the joint torque, by feedback computation based on a difference between the joint angle and the target joint angle.

11. The control device according to claim 9,
wherein the control unit executes, as the joint torque computation processing,
  feed-forward computation processing to obtain feed-forward control torque as to the first joint, by feed-forward computation based on the target joint angle,
  feedback computation processing to obtain feedback control torque, by feedback computation based on a difference between the joint angle and the target joint angle, and
  adding processing to obtain the joint torque by adding the feed-forward control torque to the feedback control torque.

12. The control device according to claim 10,
wherein the control unit executes, as the feedback computation processing, a PD control to compensate for the difference.

13. The control device according to claim 11,
wherein the control unit executes, as the feedback computation processing, a PD control to compensate for the difference.

14. The control device according to claim 9,
wherein the control unit obtains the elastic torque by computing $U_1 \times k \times r^2 \times \theta$ where k represents the elastic constant of the mono-articular driving actuators and $\theta$ represents the joint angle, as the elastic torque computation processing.

15. The control device according to claim 9,
wherein the control device controls the pair of mono-articular driving actuators, and also controls a pair of bi-articular simultaneous driving actuators,
wherein the pair of bi-articular simultaneous driving actuators are disposed on both sides of the first link and a second link rotatably linked to the first link by a second joint, to generate tensile forces, and rotationally drive the first link on the first joint, and simultaneously rotationally drive the second link on the second joint,
and wherein the control unit computes the force command values which satisfy restriction of positive values as to the bi-articular simultaneous driving actuators, so as to cancel torque provided to the first joint and the second joint by elasticity of the bi-articular simultaneous driving actuators.

* * * * *